(12) United States Patent
Tsubone et al.

(10) Patent No.: US 10,205,754 B2
(45) Date of Patent: Feb. 12, 2019

(54) TRANSMISSION SYSTEM, TRANSMISSION MANAGEMENT APPARATUS AND NON-TRANSITORY COMPUTER-READABLE INFORMATION RECORDING MEDIUM

(71) Applicants: Shuhei Tsubone, Tokyo (JP); Yoshinaga Kato, Kanagawa (JP)

(72) Inventors: Shuhei Tsubone, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 105 days.

(21) Appl. No.: 14/620,457

(22) Filed: Feb. 12, 2015

(65) Prior Publication Data
US 2015/0229681 A1    Aug. 13, 2015

(30) Foreign Application Priority Data

Feb. 13, 2014   (JP) ................................. 2014-025604
Feb. 13, 2014   (JP) ................................. 2014-025605
Dec. 22, 2014   (JP) ................................. 2014-258924

(51) Int. Cl.
*H04L 29/06*    (2006.01)

(52) U.S. Cl.
CPC ...... *H04L 65/1069* (2013.01); *H04L 65/1076* (2013.01); *H04L 65/4038* (2013.01)

(58) Field of Classification Search
None
See application file for complete search history.

(56) References Cited

U.S. PATENT DOCUMENTS

| 7,269,162 | B1 * | 9/2007 | Turner | ................ | H04M 1/2478 |
| | | | | | 370/352 |
| 2006/0248077 | A1 * | 11/2006 | Horikiri | ............ | G06F 17/30011 |
| 2008/0084984 | A1 * | 4/2008 | Levy | ................... | H04L 12/1818 |
| | | | | | 379/202.01 |

(Continued)

FOREIGN PATENT DOCUMENTS

WO   WO 2011/077501 A1   6/2011

*Primary Examiner* — Nicholas Sloms
(74) *Attorney, Agent, or Firm* — Oblon, McClelland, Maier & Neustadt, L.L.P.

(57) ABSTRACT

A transmission system that manages sessions established among a plurality of transmission terminals. The transmission system includes a terminal information request signal transmission part that transmits, from a first transmission terminal, a terminal information request signal to request information for identifying a third transmission terminal currently establishing a session with a second transmission terminal that is designated by a user as a destination; and a display part that carries out display in such a manner that the user can determine whether to allow the third transmission terminal to establish a session with the first transmission terminal based on information received in response to the terminal information request signal. The information includes first information for identifying a transmission terminal eligible to establish a session with the first transmission terminal and second information that is the information for identifying the third transmission terminal currently establishing the session with the second transmission terminal.

20 Claims, 33 Drawing Sheets

(56) References Cited

U.S. PATENT DOCUMENTS

| | | | |
|---|---|---|---|
| 2008/0229208 A1* | 9/2008 | Sahashi | H04L 43/0817 715/736 |
| 2009/0094367 A1* | 4/2009 | Song | H04L 12/1818 709/227 |
| 2010/0226546 A1* | 9/2010 | Tanaka | H04N 7/147 382/118 |
| 2011/0090899 A1* | 4/2011 | Fedorov | H04M 3/51 370/352 |
| 2011/0216699 A1* | 9/2011 | Umehara | H04L 12/1813 370/328 |
| 2012/0221702 A1* | 8/2012 | Umehara | H04L 12/1818 709/223 |
| 2013/0242034 A1 | 9/2013 | Kato et al. | |
| 2013/0335514 A1* | 12/2013 | Umehara | H04L 12/1818 348/14.08 |

* cited by examiner

FIG.6

| RELAY DESTINATION TERMINAL IP ADDRESS | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.8

| RELAY APPARATUS ID | OPERATION STATE | RECEIVED DATE/TIME | IP ADDRESS OF RELAY APPARATUS | MAXIMUM TRANSMISSION RATE (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.2.2.2 | 10 |
| 111e | ON LINE |  | 1.1.1.3 |  |

FIG.9

| TERMINAL ID | PASSWORD |
|---|---|
| 01aa | aaaa |
| 01ab | abab |
| 01ba | baba |
| ... | ... |

FIG.10

| TERMINAL ID | TERMINAL NAME | OPERATION STATE | COMMUNICATION STATE | RECEIVED DATA/TIME | IP ADDRESS OF TERMINAL |
|---|---|---|---|---|---|
| 01aa | JAPAN TOKYO OFFICE AA TERMINAL | ON LINE (CONVERSATION ENABLE) | NONE | 2009.11.10.13:40 | 1.2.1.3 |
| 01ab | JAPAN TOKYO OFFICE AB TERMINAL | OFF LINE | | 2009.11.09.12:00 | 1.2.1.4 |
| ... | ... | ... | ... | ... | ... |
| 01ba | JAPAN OSAKA OFFICE BA TERMINAL | ON LINE (ON CONVERSATION) | PRIVATE CALLING | 2009.11.10.13:45 | 1.2.2.3 |
| 01bb | JAPAN OSAKA OFFICE BB TERMINAL | ON LINE (ON CONVERSATION) | PRIVATE BUSY | 2009.11.10.13:50 | 1.2.2.4 |
| ... | ... | ... | ... | ... | ... |
| 01ca | USA NEW YORK OFFICE CA TERMINAL | OFF LINE | | 2009.11.10.12:45 | 1.3.1.3 |
| 01cb | USA NEW YORK OFFICE CB TERMINAL | OFF LINE | | 2009.11.10.13:55 | 1.3.1.4 |
| ... | ... | ... | ... | ... | ... |
| 01da | USA WASHINGTON OFFICE DA TERMINAL | ON LINE (ON CONVERSATION) | PRIVATE BUSY | 2009.11.08.12:45 | 1.3.2.3 |
| 01db | USA WASHINGTON OFFICE DB TERMINAL | ON LINE (CONVERSATION ENABLE) | NONE | 2009.11.10.12:45 | 1.3.2.4 |
| ... | ... | ... | ... | ... | ... |

FIG.11

| START REQUEST TERMINAL ID | DESTINATION TERMINAL ID |
|---|---|
| 01aa | 01ab, 01ba,01db,01dc |
| 01ab | 01aa,01ca,01cb |
| 01ba | 01aa,01ab,01ca,01cb,01da,01db |
| 01cb | 01aa,01bb,01db |
| 01db | 01aa,01cb,01da |
| ... | ... |

FIG.12

| SESSION ID | RELAY APPARATUS ID | START REQUEST TERMINAL ID | DESTINATION TERMINAL ID | DELAY TIME (ms) | DELAY INFORMATION RECEIVED DATE/TIME |
|---|---|---|---|---|---|
| se1 | 111e | 01aa | 01db | 200 | 2009.11.10.14:00 |
| se2 | 111b | 01ba | 01be | 50 | 2009.11.10.14:10 |
| se3 | 111c | 01cd | 01cf | 400 | 2009.11.10.14:20 |
| ... | ... | ... | ... | ... | ... |

FIG.13

| DELAY TIME (ms) | IMAGE QUALITY OF IMAGE DATA (QUALITY OF IMAGE) |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPT) |

FIG.14

| TERMINAL ID | RELAY APPARATUS ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.15

| CHANGE REQUEST INFORMATION | BEFORE-CHANGE STATE INFORMATION | CHANGE INFORMATION |
|---|---|---|
| CALL | NONE | ACCEPTED |
| JOIN | ACCEPTED | BUSY |
| | PRIVATE ACCEPTED | PRIVATE BUSY |
| LEAVE | BUSY | NONE |
| | PRIVATE BUSY | NONE |

FIG.16

| CHANGE REQUEST INFORMATION | TERMINAL INFORMATION | BEFORE-CHANGE STATE INFORMATION | CHANGE INFORMATION |
|---|---|---|---|
| INVITE | START REQUEST TERMINAL | NONE | CALLING |
| | DESTINATION TERMINAL | NONE | RINGING |
| PRIVATE INVITE | START REQUEST TERMINAL | NONE | PRIVATE CALLING |
| | DESTINATION TERMINAL | NONE | PRIVATE RINGING |
| ACCEPT | START REQUEST TERMINAL | CALLING | ACCEPTED |
| | | PRIVATE CALLING | PRIVATE ACCEPTED |
| | | ACCEPTED | ACCEPTED |
| | | PRIVATE ACCEPTED | PRIVATE ACCEPTED |
| | DESTINATION TERMINAL | RINGING | ACCEPTED |
| | | PRIVATE RINGING | PRIVATE ACCEPTED |

FIG.25

| MACHINE NUMBER | TERMINAL ID |
|---|---|
| XX-XXXXXX | 01aa |
| ... | ... |

FIG.29

CONFERENCE PARTICIPANT

| TERMINAL NAME | TERMINAL ID |
|---|---|
| 01: JAPAN TOKYO OFFICE AA TERMINAL | 01aa |
| 02: | 01cb |
| 03: USA WASHINGTON OFFICE DB TERMINAL | 01db |

DO YOU PARTICIPATE IN THIS VIDEO CONFERENCE?

OK

CANCEL

TRANSMISSION SYSTEM, TRANSMISSION MANAGEMENT APPARATUS AND NON-TRANSITORY COMPUTER-READABLE INFORMATION RECORDING MEDIUM

BACKGROUND OF THE INVENTION

1. Field of the Invention

The present invention relates to a transmission system, a transmission management apparatus and a non-transitory computer-readable information-recording medium.

2. Description of the Related Art

In a remote conference system, in a conference room where participants of a remote conference are present, transmission terminals are used to take photographs of the participants, collect statements of the participants, or so, to collect images and/or sounds. Then, the collected images/sounds are converted into digital data, which is then transmitted to other transmission terminals, the images are displayed on display devices in other conference rooms or the sounds are generated from speakers. Thus, a state similar to an actual conference can be implemented.

In such a remote conference system, it is possible that all transmission terminals of participants of a conference are connected via a relay apparatus(es), the relay apparatus(es) controls distribution of image data and/or sound data to the respective transmission terminals, and thus, it is possible to implement a remote conference among a plurality of locations.

Generally speaking, in a remote conference performed among a plurality of locations, a display screen of each transmission terminal is divided into the number of areas corresponding to the number of transmission terminals of participants of the conference and images transmitted from the transmission terminals are displayed in the respective areas of the display screen, for the purpose that each user can know, from the transmission terminals, who participate in the conference, during the conference. Thus, each user can know which transmission terminals participate in the conference.

Japanese Laid-Open Patent Application No. 2012-195926 (Patent Reference No. 1) discloses the following point. That is, as the number of participants of a conference increases, the number of areas to which a display screen is divided increases, whereby each area is reduced, and thus, it may be difficult for each user to understand which transmission terminals participate in the conference. In order to solve the problem, detailed conference information is displayed separate to the displays in the divided areas of the display device of each transmission terminal.

SUMMARY OF THE INVENTION

According to one aspect of the present invention, a transmission system manages sessions established among a plurality of transmission terminals. The transmission system includes a terminal information request signal transmission part that transmits, from a first transmission terminal, a terminal information request signal to request information for identifying a third transmission terminal currently establishing a session with a second transmission terminal that is designated by a user as a destination; and a display part that carries out display in such a manner that the user can determine whether to allow the third transmission terminal to establish a session with the first transmission terminal based on information received in response to the terminal information request signal. The information includes first information for identifying a transmission terminal eligible to establish a session with the first transmission terminal and second information that is the information for identifying the third transmission terminal currently establishing the session with the second transmission terminal.

Other objects, features and advantages of the present invention will become more apparent from the following detailed description when read in conjunction with the accompanying drawings.

BRIEF DESCRIPTION OF THE DRAWINGS

FIG. 6 illustrates one example of a change quality management table;

FIG. 8 illustrates one example of a relay apparatus management table;

FIG. 9 illustrates one example of a terminal authentication management table;

FIG. 10 illustrates one example of a terminal management table;

FIG. 11 illustrates one example of a destination list management table;

FIG. 12 illustrates one example of a session management table;

FIG. 13 illustrates one example of a quality management table;

FIG. 14 illustrates one example of a relay apparatus selection management table;

FIG. 15 illustrates one example of a state change management table;

FIG. 16 illustrates one example of a state change management table;

FIG. 25 illustrates one example of a prior authentication management table;

FIG. 28 illustrates one example of the process of generating a UI based on the destination list and/or the like;

FIG. 29 illustrates one example of a conference participant prior confirmation screen page;

FIG. 30 illustrates another example of the process of generating a UI based on the destination list and/or the like;

DETAILED DESCRIPTION OF THE EMBODIMENTS

Below, using the drawings, the embodiments of the present invention will be described in detail.

As described above, in the related art, it is possible to know transmission terminals of participants of a conference during the conference. However, it is not possible to know which transmission terminals currently participate in the conference immediately before they participate in the conference. Therefore, there may be a case where a user participates in a conference in which the user does not wish to participate.

In other words, a user selects a destination terminal from among transmission terminals participating in a conference before participating in the conference. However, there may be a case where the thus selected destination terminal is participating in a conference other than a conference a user expects. In such a case, the user understands that the user made a mistake after viewing an image from another transmission terminal after participating in the conference.

The embodiments of the present invention have been devised in consideration of such a situation, and an object thereof is to provide a configuration where it is possible to check whether a conference is one in which a user intends to participate before actually participating in the conference.

Below, the embodiments of the present invention will be described in detail.

<Overall Configuration of Transmission System>

Figure 1:
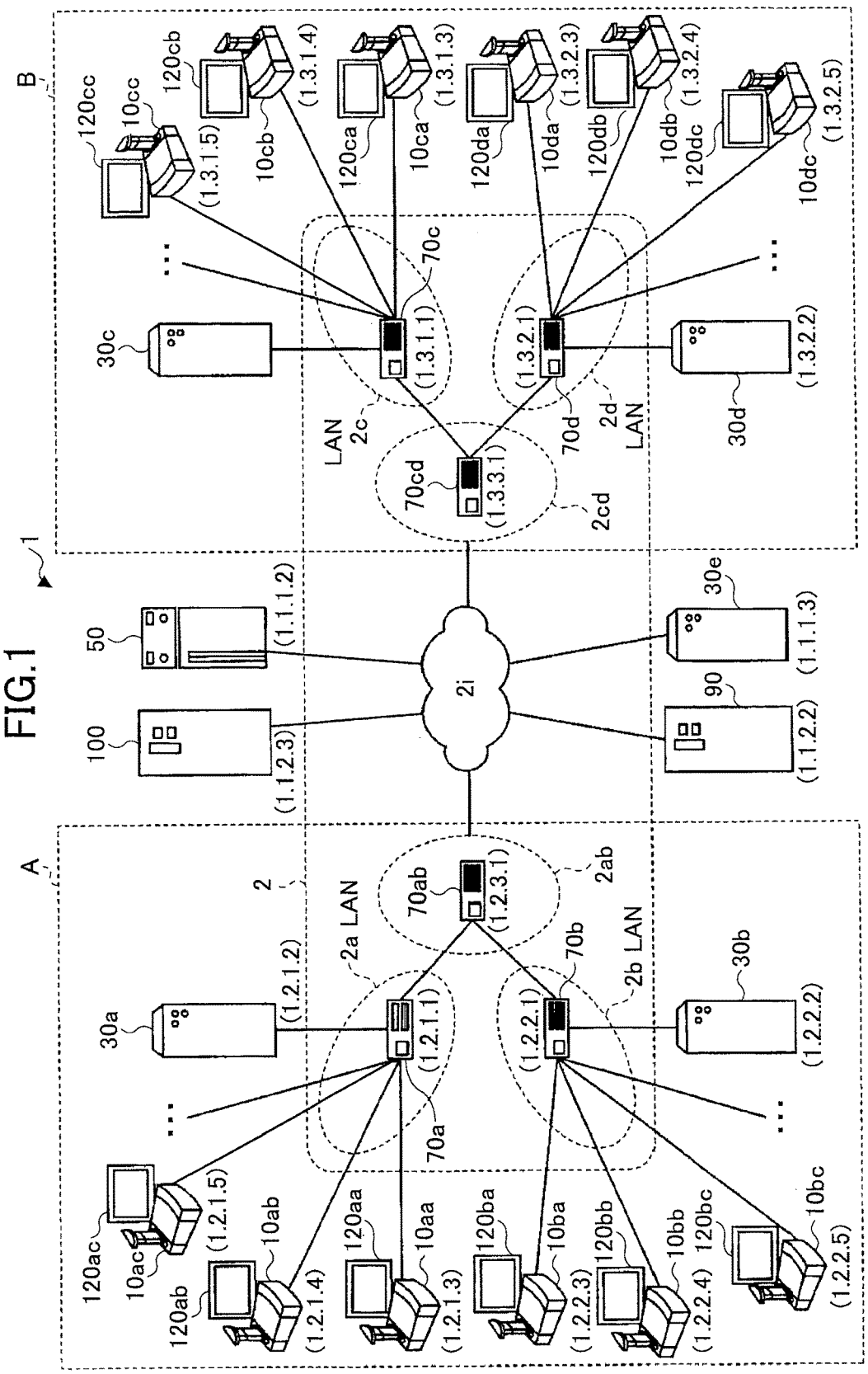
FIG. 1 generally illustrates a transmission system.

FIG. 1 generally illustrates a transmission system 1 according to one embodiment. A specific example of the transmission system 1 can be a data provisioning system unidirectionally transmitting content data from one transmission terminal to another transmission terminal via a transmission management system, a communication system mutually transmitting information, feelings and/or so among a plurality of transmission terminals via a transmission management system, or so. The communication system is a system for mutually transmitting information, feelings or so among a plurality of communication terminals (corresponding to transmission terminals) via a communication management system (corresponding to a transmission management system). A specific example of the communication system can be a video conference system, a TV telephony system, a voice conference system, a voice telephony system, a Personal Computer (PC) screen sharing system, or so.

Assuming a video conference system as one example of a communication system, assuming a video conference management system as one example of a communication management system, and assuming video conference terminals as one example of communication terminals, a transmission system 1, a transmission management system (or a management apparatus) 50 and transmission terminals 10 will be described.

The transmission system 1 shown in FIG. 1 includes a plurality of transmission terminals (10aa, 10ab, . . . ), display devices (120aa, 120ab, . . . ) for the respective transmission terminals (10aa, 10ab, . . . ), a plurality of relay apparatuses (30a, 30b, 30c, 30d and 30e), the transmission management system 50, a program provisioning system 90 and a maintenance system 100. Note that, below, "transmission terminals" may be also simply referred to as "terminals".

Note that, in the transmission system 1, a "transmission terminal 10" denotes any one of the transmission terminals (10aa, 10ab, . . . ); a "display device 120" denotes any one of the display devices (120aa, 120ab, . . . ); and a "relay apparatus 30" denotes any one of the relay apparatuses (30a, 30b, 30c, 30d and 30e).

A transmission terminal 10 transmits and receives various information to/from other apparatuses. The transmission terminal 10, for example, establishes a session with another transmission terminal 10, and carries out a conversation by transmitting and receiving sound data and image data through the established session. Thus, in the transmission system 1, a video conference can be implemented among a plurality of transmission terminals 10.

Below, "content data" denotes "image data and sound data". Note that, data transmitted among transmission terminals 10 is not limited to the embodiment. For example, content data can be text data. Also, content data can include text data in addition to sound data and image data. Also, image data can be moving picture, static picture or can be one including both moving picture and static picture.

In the transmission system 1, when a video conference is started, a user who wishes to start it operates a predetermined transmission terminal 10, and thus, the transmission terminal 10 transmits start request information to the transmission management system 50.

Start request information is information requesting to start a session to be used for a video conference and includes information designating another transmission terminal 10 with which the session is established. Below, a transmission terminal which transmits start request information will be referred to as a start request terminal. Also, another transmission terminal 10 designated for establishing the session with the start request terminal will be referred to as a destination terminal.

Note that, a destination terminal can be a single transmission terminal 10 or two or more transmission terminals 10. In other words, in the transmission system 1, it is possible to implement a video conference using a session established not only between two transmission terminals 10 but also among three or more transmission terminals 10.

Further, in the transmission system 1, it is also possible that, after a session has been already established and a video conference has been started, a user can newly participate in the video conference. A user who wishes to participate in the video conference operates a predetermined transmission terminal 10, and thereby, the operated transmission terminal 10 transmits to the transmission management system 10 a participation request information designating the already established session (referred to as an "established session") used for the video conference in which the user wishes to participate. Hereinafter, a transmission terminal 10 transmitting participation request information will be referred to as a "participating request terminal".

The transmission management system 50 unitarily manages the transmission terminals 10 and the relay apparatuses 30. By establishing a session between transmission terminals 10, the transmission management system 50 implements a video conference for conversations or so between the transmission terminals 10.

When receiving start request information for a session from a predetermined transmission terminal 10, the transmission management system 50 establishes a session between the transmission terminal (start request terminal) which has transmitted the start request information and the destination terminal, and starts a video conference. Also, when receiving participation request information from a predetermined transmission terminal 10 for an already established session, the transmission management system 50 determines whether to allow the participating request terminal to participate in the established session.

A plurality of routers (70a, 70b, 70c, 70d, 70ab and 70cd) shown in FIG. 1 select optimal routes for transmitting content data. Note that, in the transmission system 1, a "router 70" denotes any one of the routers (70a, 70b, 70c, 70d, 70ab and 70cd). A relay apparatus 30 relays content data between a plurality of transmission terminals 10.

The program provisioning system 90 has a hard disk (HD) storing a terminal program for causing each transmission terminal 10 to carry out various functions and/or implement various functional parts, and transmits the terminal program to each transmission terminal 10. The HD of the program provisioning system 90 also stores a relay apparatus program for causing each relay apparatus 30 to carry out various functions and/or implement various functional parts, and transmits the relay apparatus program to each relay apparatus 30. The HD of the program provisioning system 90 also stores a transmission management program for causing the transmission management system 50 to carry out various functions and/or implement various functional parts, and transmits the transmission management program to the transmission management system 50.

The maintenance system 100 is a computer that carries out maintenance or management of at least one of the transmission terminals 10, the relay apparatuses 30, the transmission management system 50 and the program provisioning system 90. For example, when the maintenance system 100 is installed in the own country while the transmission terminals 10, the relay apparatus 30, the transmission management system 50 or the program provisioning system 90 is installed in a foreign country, the maintenance system 100 uses a communication network 2 to remotely carry out maintenance and/or management of at least one of the transmission terminals 10, the relay apparatuses 30, the transmission management system 50 and the program provisioning system 90. Also, the maintenance system 100 carries out maintenance such as management of the apparatus type numbers, the manufacture numbers, the sales destinations, the maintenance and inspection or the fault histories of at least one of the transmission terminals 10, the relay apparatuses 30, the transmission management system 50 and the program provisioning system 90 without using the communication system 2.

Also, the transmission terminals (10aa, 10ab, 10ac, 10a . . . ), the relay apparatuses 30a and the router 70a are connected via a LAN 2a in a communicatable manner. The transmission terminals (10ba, 10bb, 10bc, 10b . . . ), the relay apparatus 30b and the router 70b are connected via a LAN 2b in a communicatable manner. Also, the LAN 2a and the LAN 2b are connected via a private line 2ab including the router 70ab in a communicable manner and are built in a predetermined area A. For example, the area A is Japan, the LAN 2a is built in a Tokyo office and the LAN 2b is built in an Osaka office.

The transmission terminals (10ca, 10cb, 10cc, 10c . . . ), the relay apparatus 30c, and the router 70c are connected via a LAN 2c in a communicable manner. The transmission terminals (10da, 10db, 10dc, 10d . . . ), the relay apparatus 30d and the router 70d are connected via a LAN 2d in a communicable manner. Also, the LAN 2c and the LAN 2d are connected via a private line 2cd including the router 70cd in a communicable manner and is built in a predetermined area B. For example, the area B is the U.S.A., the LAN 2c is built in a New York office and the LAN 2d is built in a Washington D.C. office. The area A and the area B are connected via the internet 2i from the respective routers (70ab, 70cd).

Also, the transmission management system 50 and the program provisioning system 90 can be connected with the transmission terminals 10 and the relay apparatuses 30 via the Internet 2i in a communicable manner. The transmission management system 50 and the program provisioning system 90 can be installed in the areas A and B, or can be installed another area(s) than the areas A and B.

Also, the relay apparatus 30e is connected to the transmission terminals 10 via the Internet 2i in a commutable manner. The relay apparatus 30e continuously operates, and, for the purpose of being not likely to be affected by the communication amounts in the local areas of the areas A and B, is installed in another area. Thereby, when a transmission terminal 10 carries out a conversation with another transmission terminal installed in another local area, the relay apparatus 30e is used for relaying content data. Also, even in a case where a conversation is carried out within the same local area, the relay apparatus 30e can be used for an emergency use when the relay apparatus at this area does not work.

Note that, in the transmission system 1, the communication network 2 is built using the LAN 2a, the LAN 2b, the private line tab, the Internet 2i, the private line 2cd, the LAN 2c and the LAN 2d. The communication network 2 can include not only a wired part(s) but also a wireless part(s) for implementing communication.

Also, in FIG. 1, numerals of 4 digits shown under each transmission terminal 10, each relay apparatus 30, the transmission management system 50, each router 70, the program provisioning system 90 and the maintenance system 100 simply show IP addresses according to general IPv4. For example, the transmission terminal 10aa has the IP address of "1.2.1.3". It is also possible to use IPv6 instead of IPv4. However, for the sake of easy explanation, the description will be made using IPv4.

<Hardware Configuration of Transmission System>

Figure 2:
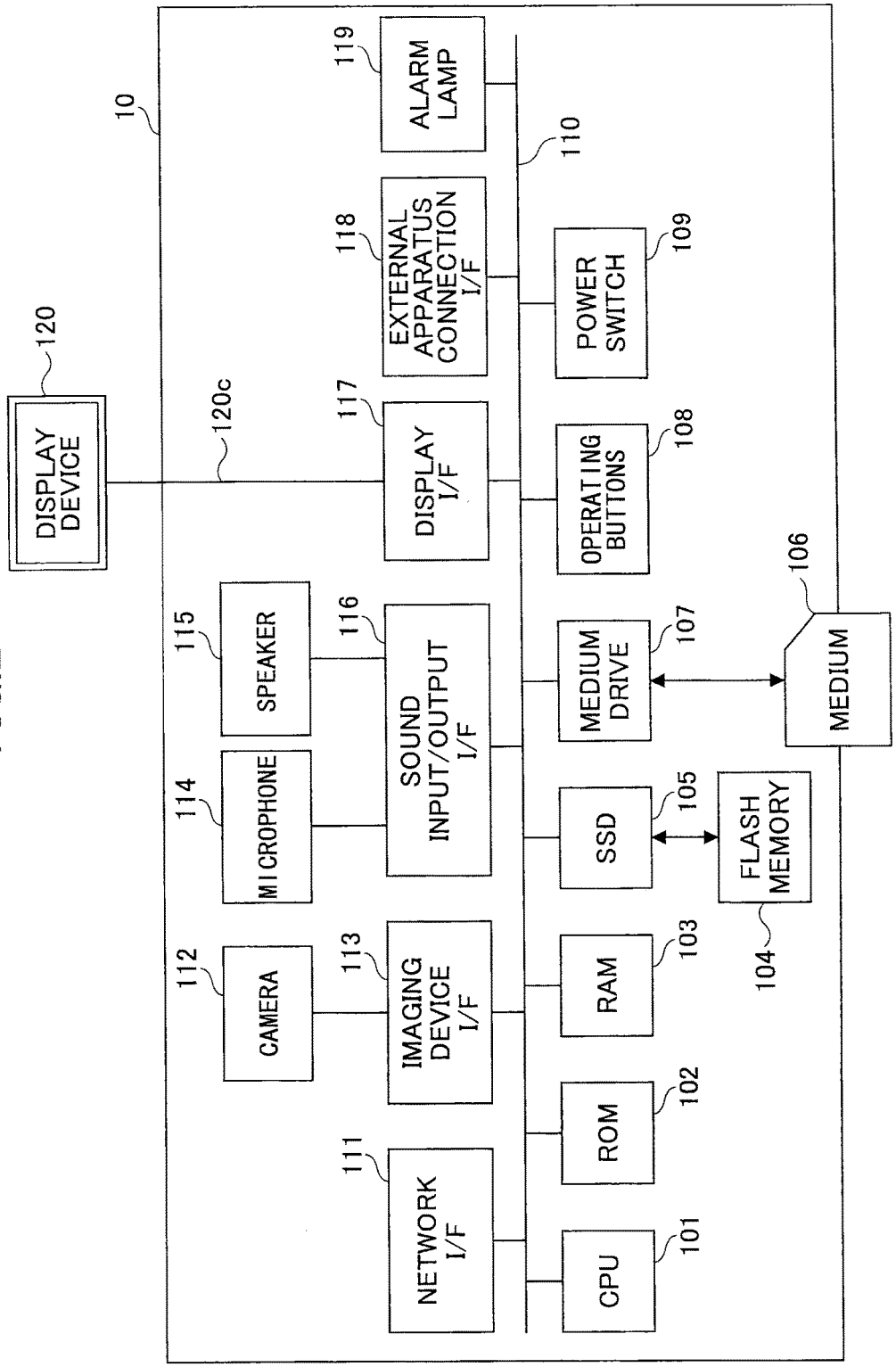
FIG. 2 illustrates a hardware configuration of a transmission terminal.

FIG. 2 is a hardware configuration diagram of each transmission terminal 10 included in the transmission system 1. As shown in FIG. 2, the transmission terminal 10 includes a Central Processing Unit (CPU) 101 controlling operations of the entire transmission terminal 10, a Read-Only Memory (ROM) 102 storing the terminal program, a Random Access Memory (RAM) 103 used as a work area of the CPU 101, a flash memory 104 storing various information such as image data, sound data and so forth, a Solid State Drive (SSD) 105 controlling reading and writing from/to the flash memory 104 under the control of the CPU 101, a medium drive 107 controlling reading and writing (storing) data from/to a recording medium 106 such as a flash memory, operating buttons operated by a user for selecting a destination terminal 10 or so, a power switch 109 for turning on or off the power in the transmission terminal 10, and a network interface (I/F) ill for data transmission using the communication network 2.

Also, the transmission terminal 10 includes a built-in-type camera 112 photographing an object under the control of the CPU 101 to acquire image data, an imaging device I/F 113 controlling to drive the camera 112, a built-in-type microphone 114 inputting sound, a built-in-type speaker 115 outputting sound, a sound input/output I/F 116 processing input and output of a sound signal between the microphone 114 and the speaker under the control of the CPU 101, a display I/F 117 transmitting image data to a display device 120 externally installed under the control of the CPU 101, an external apparatus connection I/F 118 for connecting various external apparatuses, an alarm lamp 119 reporting faults in various functions of the transmission terminal 10, and a bus line 110 such as an address bus, a data bus and so forth electrically connecting the above-mentioned respective parts as shown in FIG. 2.

The display device 120 is a display part including a liquid crystal or an organic EL displaying an image of an object, operation icons and so forth. Also, the display device 120 is connected to the display I/F 117 via a cable 120c. The cable 120c can be an analog RGB (VGA) signal cable, a component video cable, or a High Definition Multimedia Interface (HDMI) (registered trademark) or a Digital Video Interactive (DVI) signal cable.

The camera 112 includes a lens and a solid imaging device converting light into a charge and outputting an electronic signal of an image of an object. As a specific example of the solid imaging device, a Complementary Metal Oxide Semiconductor (CMOS), Charge Coupled Device (CCD) or so can be used.

Figure 4:
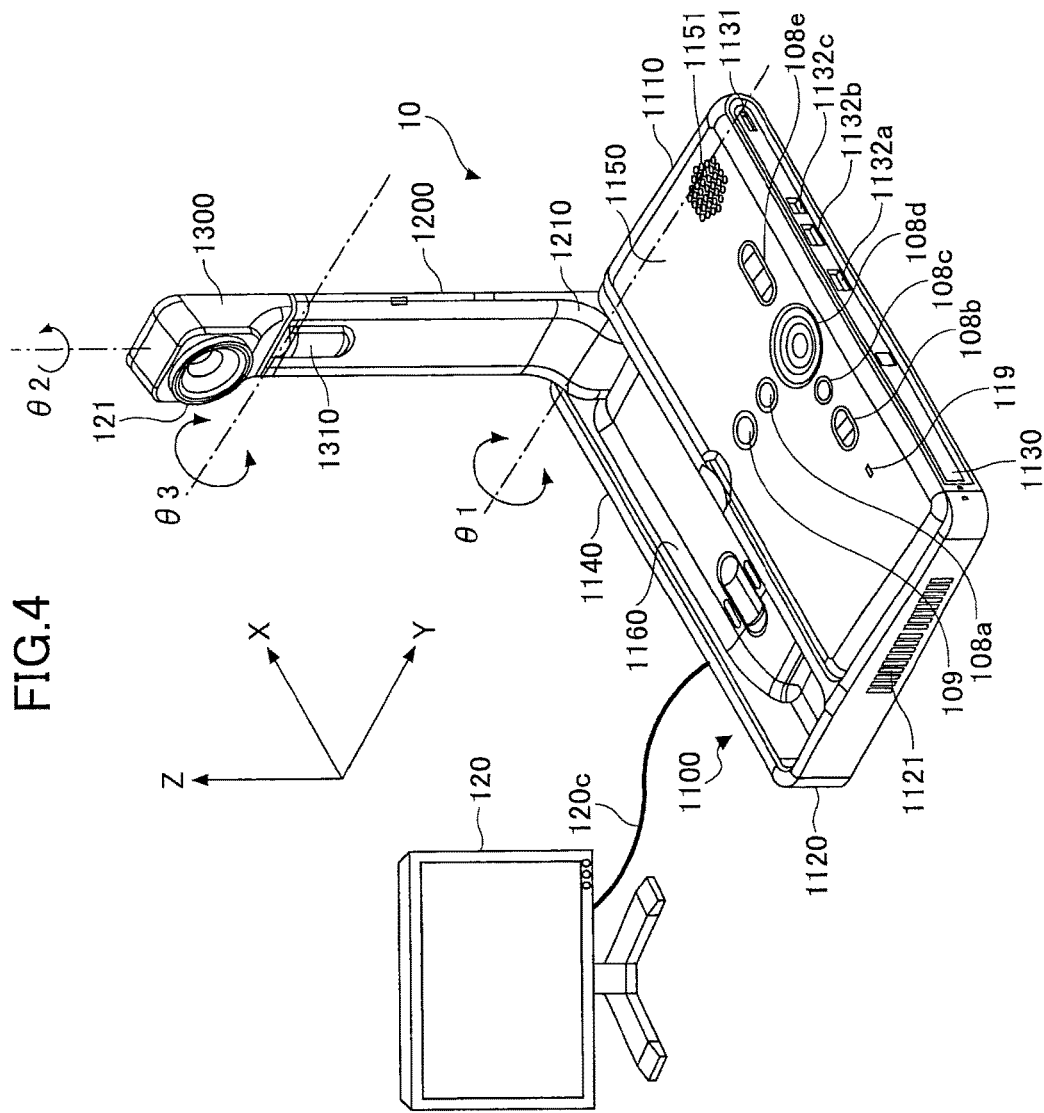
FIG. 4 illustrates an external appearance of the transmission terminal.

To the external apparatus connection I/F 118, an external apparatus such as an eternally installed camera, an externally installed microphone, an externally installed speaker or so can be electrically connected via a Universal Serial Bus (USB) cable or so inserted into a connection hole 1132 of a housing 110 described lager using FIG. 4. When the eternally installed camera is connected, it is driven in preference to the built-in-type camera 112 under the control of the CPU 101. When the externally installed microphone or the externally installed speaker is connected, it is driven in preference to the built-in-type microphone 112 or the built-in-type speaker under the control of the CPU 101.

Note that the recording medium 106 has such a configuration that it is detachable to the transmission terminal 10. Also, as long as it is nonvolatile memory to read or write data therefrom/thereto under the control of the CPU 101, it can be not only the flash memory 104 but also an Electrically Erasable and Programmable ROM (EEPROM) or so.

Further, the terminal program can be circulated after being recorded in a computer-readable recording medium (the recording medium 106 or so) in an installable format or an executable format. Also, the terminal program can be stored not only in the flash memory 104 but in the ROM 102.

Figure 3:
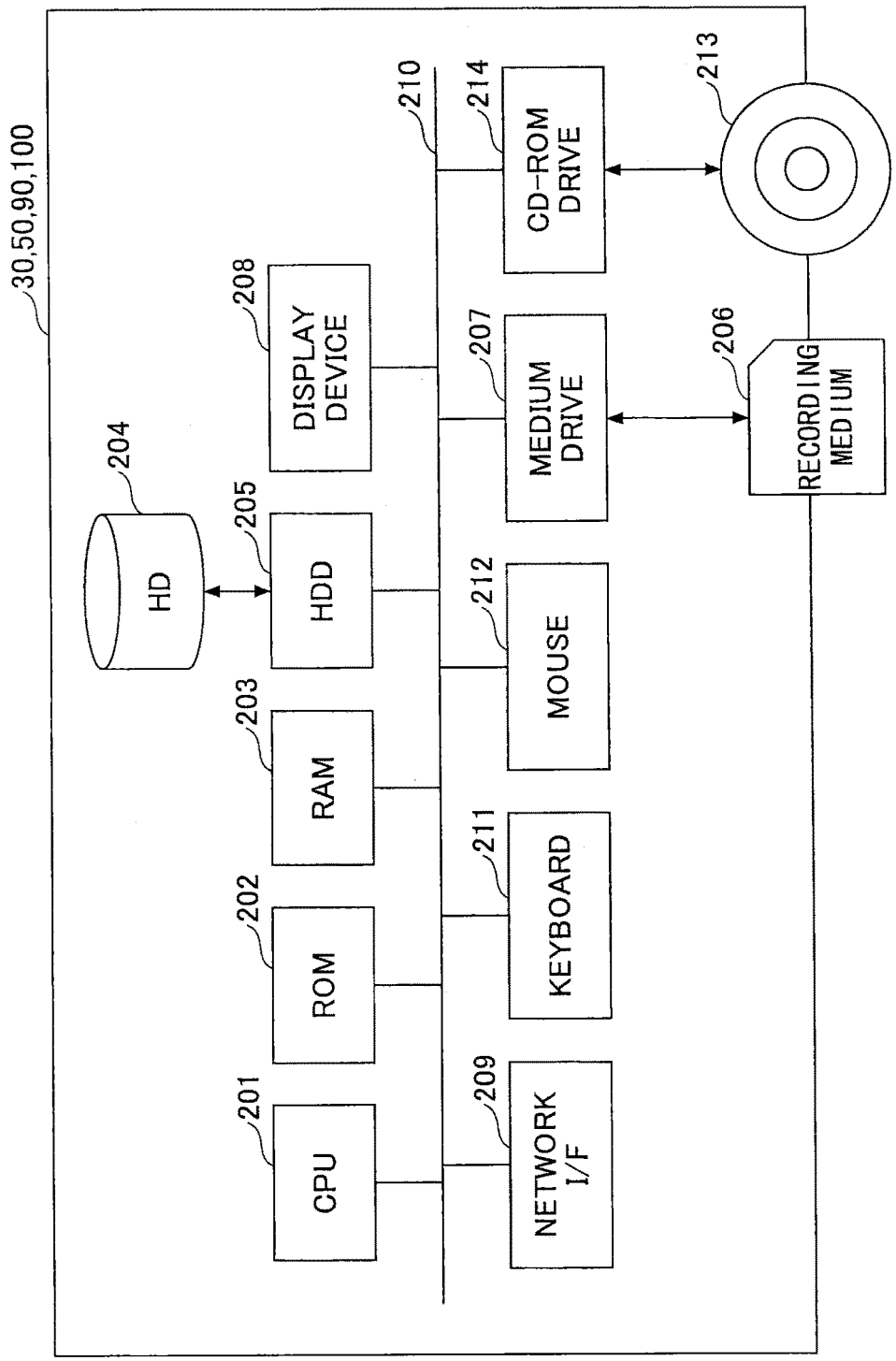
FIG. 3 illustrates a hardware configuration of a transmission management system, a relay apparatus, a program provisioning system or a maintenance system.

FIG. 3 is a hardware configuration diagram of the transmission management system 50 of the transmission system 1. The transmission management system 50 includes a CPU 201 controlling operations of the entire transmission management system 50, a ROM 202 storing the transmission management program, a RAM 203 used as a work area of the CPU 201, a Hard Disk (HD) storing various data, a Hard Disk Drive (HDD) 205 controlling reading and writing various data from/to the HD 204 under the control of the CPU 201, a medium drive 207 controlling reading and writing (storing) data from/to a recording medium 206 such as a flash memory, a display device 208 displaying various information such as a cursor, a menu, a window, characters/letters, images and so forth, a network I/F 208 for transmitting and receiving data using the communication network 2, a keyboard 211 including a plurality of keys for inputting characters/letters, numerals, various instructions and so forth, a mouse 212 for inputting a selection or execution of various instructions, a selection of processing target, a movement of a cursor, or so, a CD-ROM drive 214 controlling reading and writing data from/to a Compact Disk Read-Only Memory (CD-ROM) 213 as one example of a detachable recording medium, and a bus line 210 such as an address bus, a data bus and so forth electrically connecting the above-mentioned parts as shown in FIG. 3.

Note that, the transmission management program can be circulated after being recorded in a computer-readable recording medium (the recording medium 206, the CD-ROM 213 or so) in an installable format or an executable format.

Because the relay apparatus 30 has the same hardware configuration as the transmission management system 50, duplicate description will be omitted. However, the ROM 202 stores the relay apparatus program for controlling the relay apparatus 30. Also in this case, the relay apparatus program can be circulated after being recorded in a computer-readable recording medium (the recording medium 206, the CD-ROM 213 or so) in an installable format or an executable format.

Also, because the program provisioning system 90 has the same hardware configuration as the transmission management system 50, duplicate description will be omitted. However, the ROM 202 stores the program-providing program for controlling the program provisioning system 90. Also in this case, the program-providing program can be circulated after being recorded in a computer-readable recording medium (the recording medium 206, the CD-ROM 213 or so) in an installable format or an executable format.

Also, because the maintenance system 100 has the same hardware configuration as the transmission management system 50, duplicate description will be omitted. However, the ROM 202 stores the maintenance program for controlling the maintenance system 100. Also in this case, the maintenance program can be circulated after being recorded in a computer-readable recording medium (the recording medium 206, the CD-ROM 213 or so) in an installable format or an executable format.

Note that, as another example of the detachable recording medium, a computer-readable recording medium such as a Compact Disc Recordable (CD-R), a Digital Versatile Disk (DVD), a Blu-ray disk or so can be used to record and circulate each of the above-mentioned programs.

FIG. 4 illustrates an external appearance of each transmission terminal 10. Below, the longitudinal direction of a transmission terminal 10 corresponds to an x-axis direction, the direction in the horizontal plane perpendicular to the x-axis direction corresponds to a y-axis direction and the direction (vertical direction) perpendicular to both the x-axis direction and the y-axis direction corresponds to a z-axis direction.

As shown in FIG. 4, the transmission terminal 10 includes a housing 1100, an arm 1200 and a camera housing 1300. Thereamong, on a front wall surface 1110 of the housing 1100, an air suction surface including a plurality of air suction holes is provided. On a rear wall surface 1120 of the housing 1100, an air ejection surface including a plurality of air ejection holes is provided. Thereby, when a cooling fan inside the housing 1100 is driven, external air on the front side of the transmission terminal 10 is suctioned via the air suction surface, and is ejected to the rear side of the transmission terminal 10 via the air ejection surface 121. On a right wall surface 1130 of the housing 1100, a sound collection hole 1131 is formed such that it is possible to collect sound such as voice, sound other than voice, noise and so forth through the built-in-type microphone 114.

On the right wall surface 1130 of the housing 1100, an operation panel 1150 is formed. On the operation panel 1150, a plurality of operating buttons (108a to 108e), the power switch 109 and the alarm lamp 119 are installed. Also, a sound output surface 1151 having a plurality of sound output holes is formed there for passing through an output sound of the built-in-type speaker 115. On a left wall surface 1140 of the housing 1100, an accommodating section 1160 as a recess is formed for accommodating the arm 1200 and the camera housing 1300. On the right wall surface of the housing 1100, a plurality of connection holes (1132a-1132c) are formed for electrically connecting the cable to the external apparatus connection I/F 118. On the left wall surface 1140 of the housing 1100, connection holes are formed for electrically connecting the cable 120c for the display device 120 to the external apparatus connection I/F 118.

Note that, below, an "operating button 108" denotes any one of the operating buttons (108a-108e), and a "connection hole 1132" denotes any one of the connection holes (1132a-1132c).

Next, the arm 1200 is mounted to the housing 1100 via a torque hinge 1210. The arm 1200 is configured to be vertically rotatable in range of a tilt angle θ1 of 135 degrees with respect to the housing 1100. FIG. 4 shows the state where the tilt angle θ1 of 90 degrees.

The camera housing 1300 includes the built-in-type camera 112 which can be used to photograph a user, a book, a room and so forth. Also, to the camera housing 1300, a torque hinge 1310 is formed. The camera housing 1300 is mounted to the arm 1200 via the torque hinge 1310. Assuming that the state of the camera housing 1300 with respect to the arm 1200 shown in FIG. 4 corresponds to 0 degrees, the camera housing 1300 is configured be rotatable in a vertical direction and a horizontal direction in a range of a pan angle θ2 of ±180 degrees and in a range of a tilt angle θ3 of ±45 degrees.

Note that, as another example, each transmission terminal 10 can be a common general-purpose computer. In this case, an externally installed microphone and an externally installed camera are connected when the computer used as the transmission terminal 10 does not includes a microphone and a camera. Thus, a general-purpose computer can be used as the transmission terminal 10 according to the embodiment. Also, when a general-purpose computer is used as the transmission terminal 10, an application for causing the transmission terminal 10 to carry out the process of the transmission terminal 10 described later is installed.

Note that each relay apparatus 30, the transmission management system 50, the program provisioning system 90 and the maintenance system 100 have the same external appearances as those of common server computers. Thus, description of the external appearances therefore will be omitted.

<Functional Configuration of Transmission System>

Figure 5:
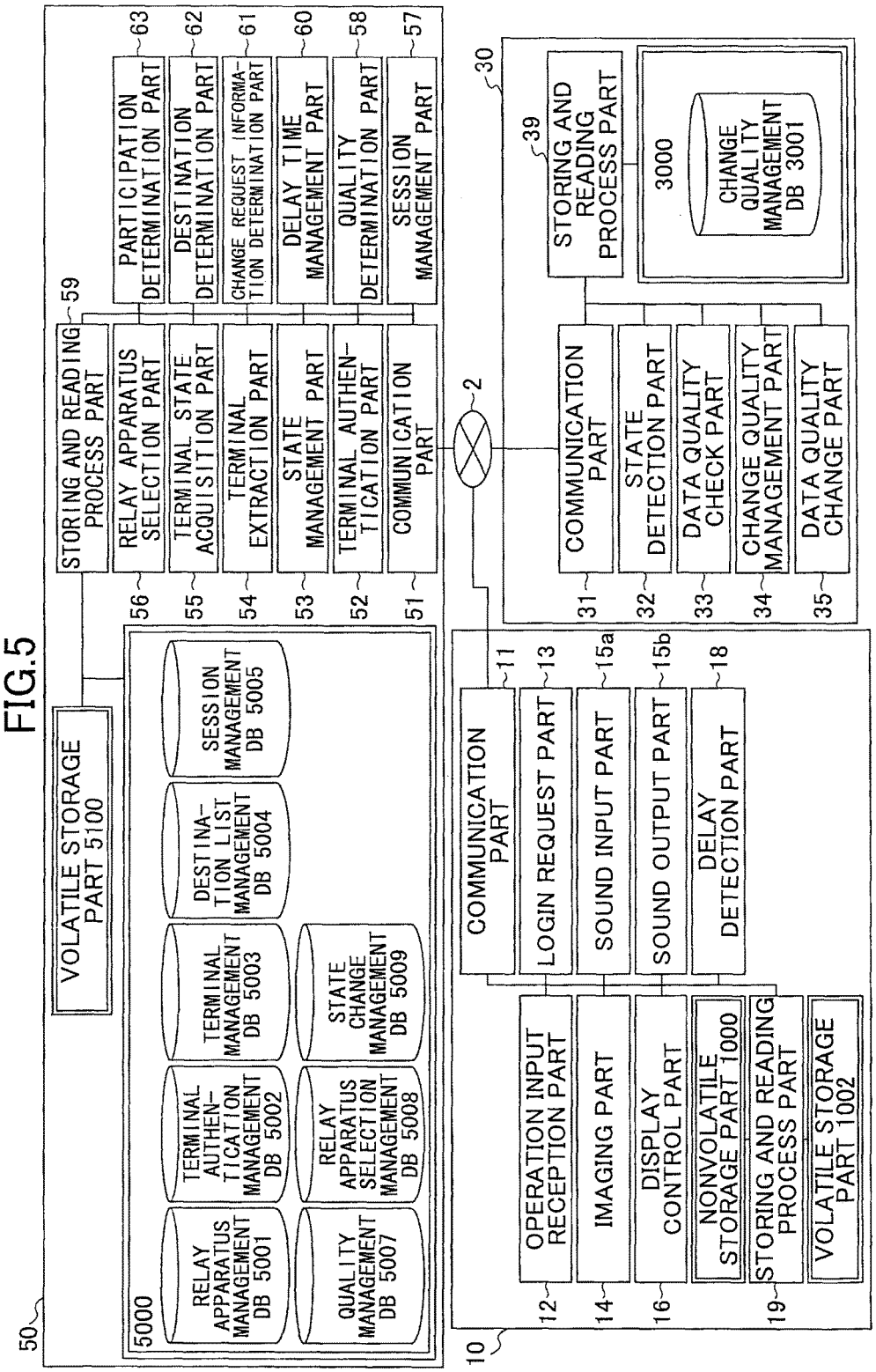
FIG. 5 is a functional block diagram of each transmission terminal, apparatus and system included in the transmission system.

Next, a functional configuration of the transmission system 1 will be described. FIG. 5 is a block diagram illustrating each transmission terminal, apparatus and system included in the transmission system 1. In FIG. 5, a transmission terminal 10, a relay apparatus 30 and the transmission management system 50 are connected via the communication network 2 in such a manner that they are capable of carrying out data communication. Because the program provisioning system 90 and the maintenance system 100 shown in FIG. 1 do not directly relate to communication for a video conference, they are omitted in FIG. 5.

<Functional Configuration of Transmission Terminal>

Each transmission terminal 10 includes a communication part 11, an operation input reception part 12, a login request part 13, an imaging part 14, a sound input part 15a, a sound output part 15b, a display control part 16, a delay detection part 18 and a storing and reading process part 19. The respective parts are functions or parts implemented by operations of the CPU 101 according to the program stored in the ROM 102 shown in FIG. 2. Also, the transmission terminal 10 includes a volatile storage part 1002 provided by the RAM 103 shown in FIG. 2 and a nonvolatile storage part 1000 provided by the flash memory 104 shown in FIG. 2.

<Functional Parts in Transmission Terminal>

Next, each part in the transmission terminal will be described in detail. The communication part 11 of the transmission terminal 10 is implemented by the network I/F 11 shown in FIG. 2, and transmits and receives various data (or information) via the communication network 2 to/from another transmission terminal, apparatus or system.

The communication part 11 starts reception of state information indicating a state of each transmission terminal 10 as a destination terminal candidate from the transmission management system 50 before this transmission terminal 10 establishes a session with another transmission terminal and starts a video conference through a conversation.

A destination terminal candidate is a transmission terminal 10 designatable by this transmission terminal 10 as a counter part of the video conference, in other words, a counter part of the session. In other words, this transmission terminal 10 is not eligible to establish a session with another transmission terminal 10 which is not previously registered as a destination terminal candidate, and thus, is not eligible to carry out a video conference therewith. Note that a destination terminal candidate is a candidate of a counter-part terminal to carry out a video conference, in other words, a counter-part terminal candidate.

Note that, state information indicates an operation state of each transmission terminal 10 (i.e., a state of "on line" or "off line") and a detailed state of, in "on line", on conversation or waiting (hereinafter, referred to as a "communication state"). Also, state information indicates, not only the operation state and the communication state of each transmission terminal 10 but also various states such as the cable being removed from the transmission terminal 10, only sound being able to be output and no image being able to be output, such a setting being made that sound is not output (MUTE), and so forth. Below, as one example, a case will be described where state information indicates an operation state and a communication state.

When this transmission terminal 10 acts as a start request terminal, the communication part 11 transmits start request information to the transmission management system 50. The start request information is information requesting to start a session to be used for a video conference. The start request information includes, specifically, information indicating to request a start, the terminal ID of the start request terminal which has transmitted the start request information, the terminal ID identifying the destination terminal with which a session is established and restriction information indicating whether to set participation restrictions inhibiting participation of a transmission terminal other than the destination terminal in the session. Note that, the terminal ID is information identifying a transmission terminal 10.

The start request information includes, specifically, "Invite" or "Private Invite", "Invite" is information requesting a start, and is restriction information not setting the participation restrictions. "Private Invite" is information indicating a start and is restriction information setting the participation restrictions.

The restriction information will be described in detail. According to the transmission system 1, another transmission terminal 10 is allowed to participate in an already established session. However, there may be a conference where it is preferable not to allow another transmission terminal 10 to participate like a conference having high confidentiality or so. Therefore, in the transmission system 1, participation of another transmission terminal 10 in an already established session is controlled according to whether the restriction information sets the participation restrictions.

Also, when the transmission terminal 10 operates as a participating request terminal, the communication part 11 transmits participation request information to the transmission management system 50. The participation request information is information requesting to participate in an established session used for an already started video conference. The participation request information includes, specifically, information "Call" indicating that this information is participation request information, the terminal ID of the participating request terminal which transmits the participation request information and the terminal ID of an on-participation transmission terminal 10 which already participates in the established session in which the participation request transmission terminal wishes to participate. The on-participation transmission terminal is, specifically, the start request terminal or the destination terminal included in the start request information transmitted when the established session was established. The communication part 11 functions as a start request information acquisition part acquiring the start request information and a participation request information acquisition part acquiring the participation request information.

The operation input reception part 12 is implemented by the operating buttons 108 and the power switch 109 shown in FIG. 2, and receives various inputs from the user. For example, when the user turns on the power switch 109 shown in FIG. 2, the operation input reception part 12 shown in FIG. 5 receives the turning-on operation and actually turns on the power.

The login request part 13 is implemented by the CPU 101 shown in FIG. 2 and automatically transmits login request information indicating to request login and the current IP address of this transmission terminal 10 from the communication part 11 to the transmission management system 50 via the communication network 2 in response to the above-mentioned turning on the power. Also, when the user turns off the power switch 109, the communication part 11 transmits state information indicating to turn off the power to the transmission management system 50, and then, the operation input reception part 12 actually turns off the power completely. Thereby, the transmission management system 50 can understand that the power is turned off in the transmission terminal 10.

The imaging part 14 is implemented by the CPU 101 shown in FIG. 2, and the camera 112 and the imaging device I/F 113 also shown in FIG. 2, photographs an object, and outputs corresponding image data. The sound input part 15a is implemented by the sound input/output I/F 116 shown in FIG. 2, and, after the microphone 114 converts the user's voice into a sound signal, the sound input part 15a inputs corresponding sound data. The sound output part 15b is implemented by the CPU 101 shown in FIG. 2, and the sound input/output I/F 116 shown in FIG. 2, outputs a sound signal corresponding to sound data to the speaker 115 so as to cause the speaker 115 to output a corresponding sound (voice).

The display control part 16 is implemented by the display I/F 117 shown in FIG. 2, and carries out control for transmitting image data to the externally installed display device 120. The display control part 16 causes the display device 120 to display a destination list including respective destination names reflecting the state information received after the start of reception by the communication part 11 before this transmission terminal 10 as a request source starts a conversation for a video conference with a transmission terminal 10 as a desired destination.

The delay detection part 18 is implemented by the CPU 101 shown in FIG. 2, and detects the delay time (ms) of image data or sound data transmitted from another transmission terminal 10 via a relay apparatus 30.

The storing and reading process part 19 is implemented by the CPU 101 shown in FIG. 2 and, for example, the SSD 105 shown in FIG. 2, stores various data in the nonvolatile storage part 1000 and reads various information from the nonvolatile storage part 1000. The nonvolatile storage part 1000 stores the terminal IDs (i.e., identifiers) identifying transmission terminals 10, passwords, and so forth. Further, the storing and reading process part 19 stores in the volatile storage part 1002 various data, and reads various data from the volatile storage part 1002. The volatile storage part 1002 stores content data received when carrying out a conversation with the destination terminal in such a manner that the content data is overwritten each time of reception. Image data before being used for the overwriting, is used to display an image on the display device 120 and a sound is output from the speaker 115 by sound data before it being used for the overwriting.

(Functional Configuration of Relay Apparatus)

Next, functions and parts of each relay apparatus 30 will be described. The relay apparatus 30 includes a communication part 31, a state detection part 32, a data quality check part 33, a change quality management part 34, a data quality change part 35 and a storing and reading process part 39. The respective parts are the functions or the parts implemented by the CPU 201 according to the program stored by the ROM 202 shown in FIG. 3. Also, the relay apparatus 30 includes a nonvolatile storage part 3000 implemented by the HD 204 shown in FIG. 3 and stores various data and information kept even after the power of the relay apparatus 30 is turned off.

(Change Quality Management Table)

The nonvolatile storage part 3000 has a change quality management DataBase (DB) 3001 built therein including a change quality management table shown in FIG. 6. In the change quality management table, the IP addresses of transmission terminals 10 to which image data is relayed and image quality of the image data relayed by the relay apparatus 30 are managed in a manner of being associated therebetween.

Figure 7A:
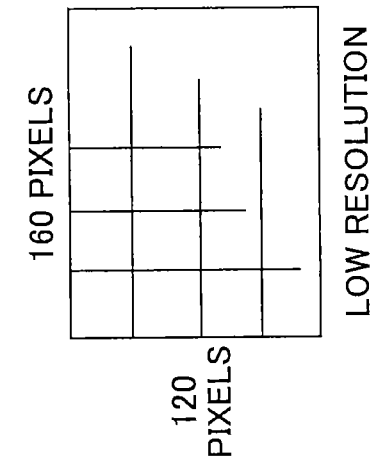
FIGS. 7A-7C are conceptual diagrams illustrating image quality of image data.
Figure 7B:
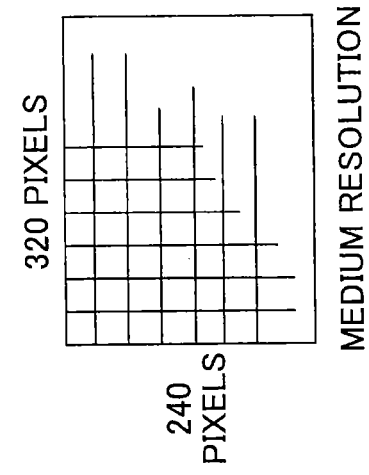
Figure 7C:
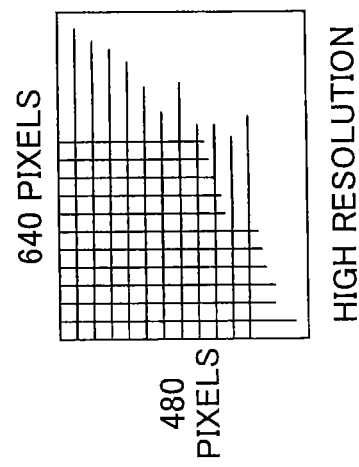

The resolution of an image of image data handled by the transmission system 1 will be described using FIGS. 7A, 7B and 7C. FIGS. 7A-7C are conceptual diagrams illustrating image quality of image data. Images of low resolution used as base images, as shown in FIG. 7A, having 160 pixels along the horizontal direction and 120 pixels along the vertical direction, images of medium resolution, as shown in FIG. 7B, having 320 pixels along the horizontal direction and 240 pixels along the vertical direction, and images of high resolution, as shown in FIG. 7C, having 640 pixels along the horizontal direction and 480 pixels along the vertical direction, are handled. Thereamong, when a narrow band path is used, image data of low image quality including only image data of low resolution as a base image is relayed. When an available band is relatively wide, image data of medium image quality including image data of low resolution as a base image and image data of medium resolution are relayed. When an available band is very wide, image data of high image quality including image data of low resolution as a base image, image data of medium resolution and image data of high resolution are relayed. For example, in the change quality management table shown in FIG. 6, when the relay apparatus 30 relays image data to a destination terminal having the IP address "1.3.2.4", the image quality (the quality of the image) to be relayed is "high image quality".

<Respective Functional Parts of Relay Apparatus>

Next, the respective functions of each relay apparatus 30 will be described in detail. Note that, below, when the respective parts of the relay apparatus 30 are described, relations with main parts for implementing the respective parts of the relay apparatus 30 shown in FIG. 3 will also be described.

The communication part 31 of the relay apparatus 30 shown in FIG. 5 is implemented by the network I/F 209 shown in FIG. 3, and transmits and receives various data (or information) to/from another transmission terminal, apparatus or system via the communication network 2. The state detection part 32 is implemented by the CPU 201 shown in FIG. 3, and detects the operation state of the relay apparatus 30 that has this state detection part 32. The operation state can be the state of "on line", "off line" or "fault".

The data quality check part 33 is implemented by the CPU 201 shown in FIG. 3, searches the change quality management table (see FIG. 6) using the IP address of the destination terminal as a search key, thus extracting the image quality of the corresponding image data to be relayed, and thereby, acquires the image quality of the image data to be relayed. The change quality management part 34 is implemented by the CPU 201 shown in FIG. 3, and changes the contents of the change quality management table of the change quality management DB 3001 based on the quality information, described later, transmitted from the transmission management system 50. For example, a case will be assumed where, during a video conference through transmission and reception of image data of high image quality between a start request terminal (a transmission terminal 10aa) having the terminal ID of "01aa" and a destination terminal (a transmission terminal 10db) having the terminal ID of "01db", another video conference is started via the communication network 2 by a start request terminal (a transmission terminal 10bb) and a destination terminal (a transmission terminal 10ca), or so. Thereby, a delay of reception of image data occurs in the destination terminal (the transmission terminal 10db). In such a case, the relay apparatus 30 needs to reduce the image quality of the image data that is being relayed from high image quality to medium image quality. In such a case, the contents of the change quality management table of the change quality management DB 3001 are changed based on the quality information indicating medium image quality in such a manner that the image quality of the image data to be relayed will be reduced from high image quality to medium image quality.

The data quality change part 35 is implemented by the CPU 201 shown in FIG. 3 and changes the image quality of the image data transmitted from the transmission terminal 10 that is the transmission source based on the thus changed contents of the change quality management table of the change quality management DB 3001. The storing and reading process part 39 is implemented by the HDD 205 shown in FIG. 3, stores various data in the nonvolatile storage part 3000 and reads various data from the nonvolatile storage part 3000.

<Functional Configuration of Transmission Management System>

Next, the functions or the parts of the transmission management system 50 will be described. The transmission management system 50 includes a communication part 51, a terminal authentication part 52, a state management part 53, a terminal extraction part 54, a terminal state acquisition part 55, a relay apparatus selection part 56, a session management part 57, a quality determination part 58, a storing and reading process part 59, a delay time management part 60, a change request information determination part 61, a destination determination part 62 and a participation determination part 63. The respective parts are the functions or the parts implemented by operations of the CPU 201 according to the program stored in the ROM 202 of FIG. 3. Also, the transmission management system 50 includes a nonvolatile storage part 5000 build in the HD 204 shown in FIG. 3 and stores various data or information that is kept even when the power of the transmission management system 50 is turned off. The nonvolatile storage part 5000 stores various information. Further, the transmission management system 50 has a volatile storage part 5100 build in the RAM 203 shown in FIG. 3.

(Relay Apparatus Management Table)

In the nonvolatile storage part 5000, a relay apparatus management DB 5001 is built including a relay apparatus management table shown in FIG. 8. In the relay apparatus management table, the operation state of the relay apparatus 30, the received date/time when the state information indicating the operation state is received by the transmission management system 50, the IP address of the relay apparatus 30 and the maximum data transmission rate (Mbps) in the relay apparatus 30 are managed in a manner of being associated for each relay apparatus ID identifying the corresponding relay apparatus 30. For example, the relay apparatus management table shown in FIG. 3 shows that the relay apparatus 30a having the relay apparatus ID having "111a" has the operation state "on line"; the transmission management system 50 received the state information at the date and time "Nov. 10, 2009, 13:00"; the IP address of the relay apparatus 30a is "1.2.1.2"; and the maximum data transmission rate in the relay apparatus 30a is 100 Mbps.

(Terminal Authentication Management Table)

Further, in the nonvolatile storage part 5000, a terminal authentication management DB 5002 is built including a terminal authentication management table shown in FIG. 9. In the terminal authentication management table, respective passwords are managed in a manner of being associated for the respective terminal IDs of all the transmission terminals 10 managed by the transmission management system 50. The terminal IDs are information identifying the corresponding transmission terminals 10. The passwords are information to be used to authenticate the corresponding transmission terminals 10. For example, the terminal authentication management table shown in FIG. 9 shows that the transmission terminal 10aa has the terminal ID "01aa" and the password "aaaa".

Note that, the terminal IDs and the relay apparatus IDs in the transmission system 1 are identification information such as languages, characters/letters, symbols, or various marks or such to be used to uniquely identify the corresponding transmission terminals 10 and the relay apparatuses 30, respectively. The terminal IDs and the relay apparatus IDs can be identification information in which two or more of languages, characters/letters, symbols, or various marks are combined.

(Terminal Management Table)

Also, in the nonvolatile storage part 5000, a terminal management DB 5003 is built including a terminal management table shown in FIG. 10. In the terminal management table, terminal names, the operation states of the transmission terminals 10, the communication states with other transmission terminals, the received date/time when login requests described later are received by the transmission management system 50 and the IP addresses of the transmission terminals 10 are managed in a manner of being associated for the terminal IDs of the respective transmission terminals 10.

The operation states can be "on line" where the power is turned on and communication can be carried out or communication is currently being carried out and "off line" where communication cannot be carried out because the power is turned off or so.

The communication state can be any one of "Calling" indicating a state of calling another transmission terminal 10, i.e., waiting for a response after transmitting a start request information for a session to be used for a video conference; "Ringing" indicating a state of being called by another transmission terminal 10, i.e., not having completed a response to start request information received from another transmission terminal 10; "Accepted" indicating a state where although a permission response to start request information from another transmission terminal 10 is completed, a session is not yet established or although reception of a permission response to start request information from the own transmission terminal 10 is completed, a session is not yet established; "Busy" indicating a state where a session with another transmission terminal 10 is established and content data for a video conference is being transmitted; "None" indicating a state of standby where no communication is carried out with another transmission terminal, and so forth Note that these communication states are those established in response to start request information including the restriction information not setting participation restrictions and corresponding to sessions not setting participation restrictions. Further, the transmission management system 50 also manages communication states which are those established in response to start request information including the restriction information setting participation restrictions and corresponding to sessions setting participation restrictions as those different from the communication states corresponding to sessions not setting participation restrictions. In other words, corresponding to "Calling", "Ringing", "Accepted" and "Busy" corresponding to sessions not setting participation restrictions, "Private Calling", "Private Ringing", "Private Accepted" and "Private Busy" corresponding to sessions setting participation restrictions are managed, respectively. Thus, the communication states are managed in a manner of being distinguished depending on whether to set participation restrictions. Thus, according to the transmission management system 50 in the embodiment, it is possible to determine, according to the communication states, whether participation restrictions are set.

Note that, according to the present embodiment, it is assumed that sessions are established where the restriction information sets participation restrictions. Therefore, according to the present embodiment, only "Private Calling", "Private Ringing", "Private Accepted", "Private Busy" are used as the communication states other than "None".

For example, the terminal management table shown in FIG. 10 indicates that the transmission terminal 10aa having the terminal ID "01aa" has the terminal name "Japan Tokyo Office AA transmission terminal", the operation state "on line", the communication state "None" indicating a standby state of not carrying out communication with another transmission terminal, the transmission management system 50 received the login request information at the date and time "Nov. 10, 2009, 13:40" and the transmission terminal 10aa has the IP address "1.2.1.3".

Also, in the terminal management table shown in FIG. 10, focusing at the communication states, the transmission terminal having the terminal ID "01ba" has the communication state "Private Calling", the transmission terminal having the terminal ID "01bb" has the communication state "Private Busy" and the transmission terminal having the terminal ID "01da" has the communication state "Private Busy".

(Destination List Management Table)

Further, in the nonvolatile storage part 5000, a destination list management DB 5004 is built including a destination list management table shown in FIG. 11. For the respective terminal IDs of start request terminals that are transmission terminals 10 as request sources of start request information for sessions used for video conferences including conversations managed by the transmission management system 50, the terminal IDs identifying destination terminal candidates that are transmission terminals 10 acting as destination candidates of content data transmitted by the transmission terminals 10 as the start request terminals are managed in a manner of being associated, in the destination list management table. For example, in the destination list management table shown in FIG. 11, the destination terminal candidates to which the transmission terminal (the transmission terminal 10aa) having the terminal ID "01aa" is eligible to request a start of a video conference are the transmission terminal 10ab having the terminal ID "01ab", the transmission terminal 10ba having the terminal ID "01ba", the transmission terminal 10db having the terminal ID "01db" and the transmission terminal 10dc having the terminal ID "01dc". These destination terminal candidates are updated through addition or deletion in response to a request of addition or deletion from the start request terminal to the transmission management system 50, if any.

(Session Management Table)

Also, in the nonvolatile storage part 5000, a session management DB 5005 is built including a session management table shown in FIG. 12. The relay apparatus IDs of the relay apparatuses 30 used for relaying content data in sessions, the terminal IDs of the start request terminals having transmitted the start request information for the sessions, the terminal IDs of the destination terminals designated as counter parts of in the start request information for the sessions, the delay times (ms) of reception of image data in the destination terminals, and the received dates/times when the delay information indicating the delay times transmitted from the destination terminals are received by the transmission management system 50 are managed in a manner of being associated for the respective session IDs where content data is transmitted between transmission terminals, in the session management table. For example, the session management table shown in FIG. 12 indicates that the relay apparatus 30e (the relay apparatus ID "111e") selected in the session executed using the session ID "sel" is relaying content data between the start request terminal 10aa having the terminal ID "01aa" and the destination terminal 10db having the terminal ID "01db", and the delay time is 200 (ms) at the destination terminal 10db at the time of "Nov. 10, 2009, 14:00". Note that, when a video conference is carried out between two transmission terminals 10, it is possible that the received date/time of the delay information is managed based on the delay information transmitted by not the destination terminal but the start request terminal. However, when a video conference is carried out among three or more transmission terminals 10, the received date/time of the delay information is managed based on the delay information transmitted from the transmission terminal at the side of receiving content data.

(Quality Management Table)

Further, in the nonvolatile storage part 5000, a quality management DB 5007 is built including a quality management table shown in FIG. 13. In the quality management table, the image qualities (qualities of the images) to be relayed by a relay apparatus 30 are associated and managed corresponding to the delay times (ms) at start request terminals or destination terminals.

(Relay Apparatus Selection Management Table)

Further, in the nonvolatile storage part 5000, a relay apparatus selection management DB 5008 is built including a relay apparatus selection management table shown in FIG. 14. The relay apparatus IDs of relay apparatuses 30 to be used to relay content data are associated with the terminal IDs of all the transmission terminals 10 managed by the transmission management system 50 and are managed in the relay apparatus selection management table.

(State Change Management Table)

Also, in the nonvolatile storage part 5000, a state change management DB 5009 is built including a state change management table shown in FIGS. 15 and 16. In the state change management table of FIG. 15, change request information indicating requests to change the communication states between transmission terminals, before-change state information indicating the communication states before being changed by the state management part 53 described later and change information indicating the communication states after being changed by the state management part 53 are associated and managed. Also, in the state change management table of FIG. 16, the change request information, terminal information for identifying the start request terminals and the destination terminals, the before-change state information and the change information are associated and managed.

The state change management table of FIG. 16 indicates that when having received change request information "Private Invite", the transmission management system 50 changes the communication state "None" of the start request terminal into "Private Calling", and changes the communication state "None" of the destination terminal into "Private Ringing". Note that the change request information can be any one of "Invite", "Private Invite" and "Accept" shown in FIG. 16, and "Join", "Call" and "Leave" shown FIG. 15, and so forth.

Note that, according to the present embodiment, it is assumed that sessions are established where the restriction information sets the participation restrictions. Therefore, in FIGS. 15 and 16, only the before-change state information and the change information "Private Accepted", "Private Busy", "Private Calling", "Private Ringing", "Private Accepted" and "Private Busy" are used. Also, for the same reason, according to the present embodiment, the change request information "Invite" shown in FIG. 16 is not used.

"Invite" is information included in the start request information, and is the change request information along with transmission of the start request information. "Accept" is the change request information along with reception of a response to the start request information, and indicates a start of communication, i.e., indicates to permit establishing a session. "Join" is the change request information along with a completion of establishment of a session corresponding to the start request information, and indicates to request to start relaying content data. "Call" is information included in a participation request, is the change request information along with transmission of the participation request, and indicates to request participation in the established session. "Leave" is the change request information indicating to terminate a session.

(Respective Functional Parts of Transmission Management System)

Next, the respective functional parts of the transmission management system 50 will be described in detail. Note that, below, when the respective functional parts of the transmission management system 50 are described, relations with main parts for implementing the respective parts of the transmission management system 50 shown in FIG. 3 will also be described.

The communication part 51 is implemented by the network I/F 209 shown in FIG. 3, and transmits and receives various data (or information) to/from another transmission terminal, apparatus or system via the communication network 2. The terminal authentication part 52 searches the terminal authentication management table (see FIG. 9) of the nonvolatile storage part 5000 using the terminal ID and the password included in the login request information received via the communication part 51 as search keys to determine whether the terminal authentication management table manages the same terminal ID and the password and thus carries out terminal authentication.

Also, the communication part 51 has a function of a notification part transmitting a notification of a participation failure to a transmission terminal which made a participation request, when the participation determination part 63, described later, determines that, because the established session sets the participation restrictions, participation is not possible.

The state management part 53 manages the operation states and the communication states in the terminal management table shown in FIG. 10. The state management part 53 stores the terminal IDs of login request terminals, the operation states of the login request terminals, the received dates/times when the transmission management system 50 received the login requests and the IP addresses of the login request terminals in the terminal management table (see FIG. 10) in a manner of associating them and manages them in order to manage the operation states of transmission terminals 10 having transmitted login requests (the login request terminals). The state management part 53 sets the operation states indicating "off line" into "on line" in the terminal management table (see FIG. 10) based on information indicating that the power is turned on transmitted from transmission terminals 10 as a result of the power switches 109 of the transmission terminals being turned on by the users. Similarly, the state management part 53 sets the operation states indicating "on line" into "off line" in the terminal management table (see FIG. 10) based on information indicating that the power is turned off transmitted from transmission terminals 10 as a result of the power switches 109 of the transmission terminals being turned off by the users.

The state management part 53 appropriately changes at least one of the operation state and the communication state of at least either one of the start request terminal and the destination terminal of the start request information of a video conference in the terminal management table (see FIG. 10) based on change request information when the communication part 51 receives the change request information transmitted from the start request terminal or the destination terminal.

Figure 17:
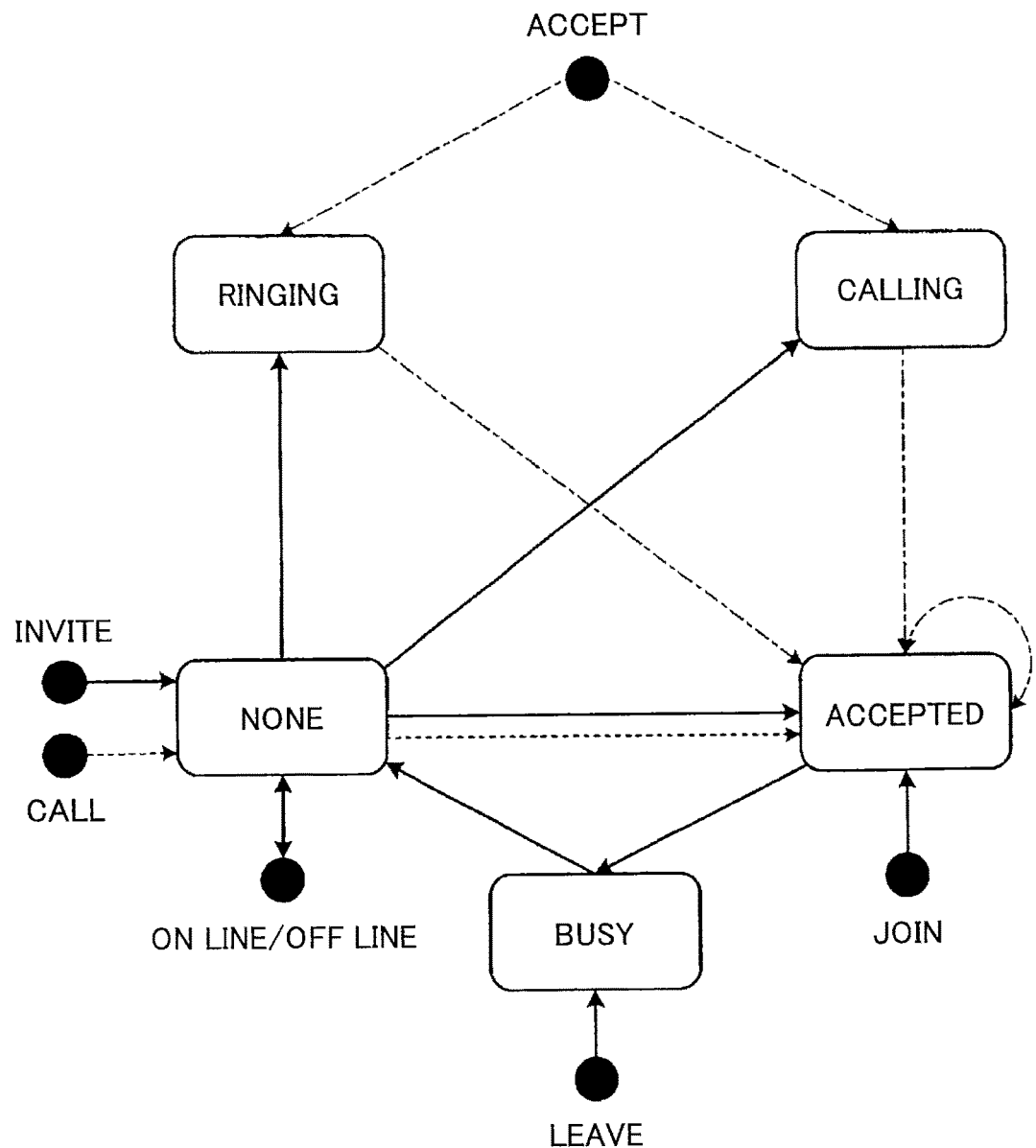
FIGS. 17 and 18 illustrate examples of state transition diagrams of communication states.
Figure 18:
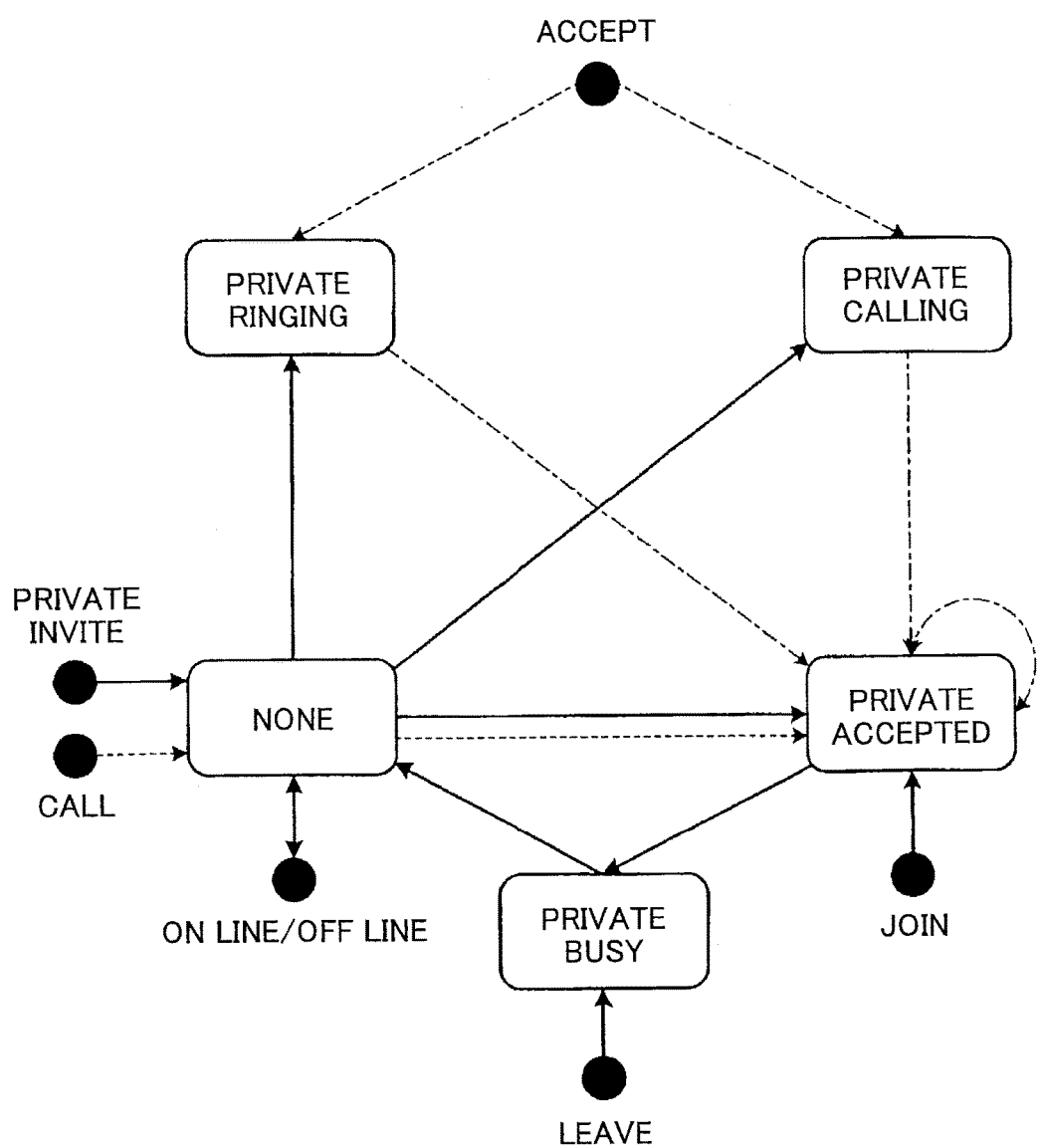

FIGS. 17 and 18 are state transition diagrams of the communication states managed by the state management part 53. The state management part 53 changes the communication states of transmission terminals 10 according to a rule for changing the communication states (see FIGS. 17 and 18) implemented from reading the state change management tables shown in FIGS. 15 and 16.

For example, in response to receiving the change request information "Accept", if the communication state of a transmission terminal 10 is "Private Ringing" or "Private Calling", the state management part 53 changes the communication state into "Private Accepted", and, if the communication state of a transmission terminal 10 is "Private Accepted", the communication state leaves "Private Accepted" as it is, as shown in FIG. 18.

According to the transmission system 1, in order to implement such a state changing function of the state management part 53, the state change management table (see FIGS. 15 and 16) is used, for example. However, it is not necessary to limit in such a way. For example, it can be sufficient that the transmission management system program controls the state management part 53 in such a manner that the state management part 53 is capable of changing the communication states according to the communication state transition rule shown in the state transition diagrams of FIGS. 17 and 18.

The terminal extraction part 54 searches the destination list management table (see FIG. 11) using the terminal IDs of target transmission terminals that are processing targets such as transmission terminals 10 having made login requests as search keys, reads the terminal IDs of the destination terminal candidates eligible to carry out conversations therewith, i.e., eligible to establish sessions therewith, and thus, extracts the terminal IDs. Specifically, the terminal extraction part 54 reads the terminal IDs of the destination terminal candidates from the destination list management table (see FIG. 11) associated with the terminal ID of the start request terminal coincident with the terminal ID of the target transmission terminal.

Also, the terminal extraction part 54 searches the destination list management table using the terminal ID of the target transmission terminal as a key and extracts also the terminal IDs of the other transmission terminals which register the terminal ID of the target transmission terminal as their destination terminal candidates. Specifically, the terminal extraction part 54 reads, from the destination list management table (see FIG. 11), the terminal IDs of the start request terminals associated with the terminal ID of the destination terminal candidates coincident with the terminal ID of the target transmission terminal.

The terminal state acquisition part 55 searches the terminal management table (see FIG. 10) using each terminal ID as a search key and reads the operation state and the communication state for the terminal ID. Thereby, the terminal state acquisition part 55 can acquire the operation states of candidates for a destination terminal eligible to carry out a conversation with a transmission terminal which made a login request. Also, the terminal state acquisition part 55 searches the terminal management table to also acquire the operation state of the transmission terminal that made the login request.

Figure 19:
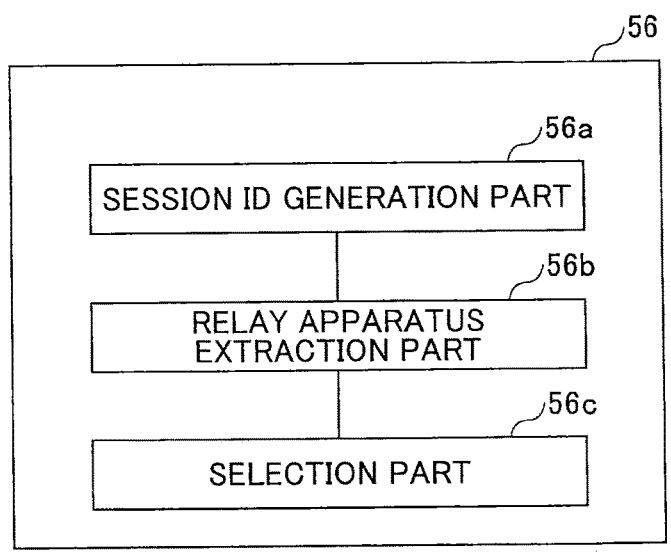
FIG. 19 is a detailed functional block diagram of a relay apparatus selection part.

The relay apparatus selection part 56 carries out a process of selecting one from among a plurality of relay apparatuses 30. For this purpose, the relay apparatus selection part 56 implements a session ID generation part 56a, a relay apparatus extraction part 56b and a selection part 56c shown in FIG. 19 using the CPU 201 shown in FIG. 3. Note that, FIG. 19 is a functional block diagram showing details of the relay apparatus selection part 56 of FIG. 5.

Thereamong, the session ID generation part 56a generates a session ID for identifying a session in which content data is transmitted between transmission terminals. The relay apparatus extraction part 56b searches the relay apparatus selection management table (see FIG. 14) based on the terminal ID of the start request terminal and the terminal ID of the destination terminal included in start request information transmitted from a start request terminal and extracts the corresponding relay apparatus IDs, respectively. The selection part 56c selects relay apparatuses 30 by selecting the relay apparatus IDs of the relay apparatuses 30 having the operation states "on line" from among those managed in the relay apparatus management table (see FIG. 8).

The session management part 57 stores, in the session management table (see FIG. 12) of the nonvolatile storage part 5000, the session IDs generated by the session ID generation part 56a, the terminal IDs of the request source transmission terminals and the terminal IDs of the destination terminals in a manner of associating them, and manages them. Also, the session management part 57 stores, in the session management table, the relay apparatus ID of the single relay apparatus 30 finally selected, for each session ID, and manages them.

Further, the session management part 57 searches the session management table (see FIG. 12) using the terminal ID of the on-participation transmission terminal already participating in the session included in the participation request information of a participation request as a search key and extracts the session ID of the session that is the target of the participation request. Specifically, the session management part 57 searches the session management table (see FIG. 12) for the terminal ID of the start request terminal or the terminal ID of the destination terminal coincident with the terminal ID of the on-participation transmission terminal. Then, the session management part 57 extracts the session ID associated with the coincident terminal ID.

The quality determination part 58 searches the quality management table (see FIG. 13) using the delay time as a search key, extracts the image quality of the corresponding image data to determine the image quality of the image data to be relayed by a relay apparatus 30. The storing and reading process part 59 is implemented by the HDD 205 shown in FIG. 3, stores various data in the nonvolatile storage part 5000 and reads various data from the nonvolatile storage part 5000. Further, the storing and reading process part 59 also stores various data in the volatile storage part 5100 and reads various data from the volatile storage part 5100.

The delay time management part 60 searches the terminal management table (see FIG. 10) using the IP address of the destination terminal as a search key and extracts the corresponding terminal ID. Then, the delay time management part 60 stores the delay time indicated by the delay information in the field of delay time of the session management table (see FIG. 12) on the record including the thus extracted terminal ID, and manages it.

The change request information determination part 61 reads the change request information, and determines whether the change request information is specific change request information. The specific change request information is "Invite", "Private Invite" and "Accept". In other words, the specific change request information is the change request information stored in the state change management table shown in FIG. 16.

The destination determination part 62 reads the destination list management table (see FIG. 11) and determines whether the destination terminal IDs of a transmission terminal 10 participating in a content data session "sed" (i.e., a session for transmitting and receiving content data) extracted by the terminal extraction part 54 include the terminal IDs of the destination terminals ID of a transmission terminal 10 making a participation request.

When the communication part 51 receives a participation request from a predetermined transmission terminal 10 for an established session, the participation determination part 63 reads the restriction information corresponding to the established session, and determines whether to permit participation of the participating request terminal that is the transmission source of the participation request information in the established session.

Specifically, in response to acquisition of the participation request information, the participation determination part 63 inhibits participation of the participating request terminal in the established session when setting the participation restrictions is designated in the restriction information.

<General Operation of Transmission System>

Figure 20:
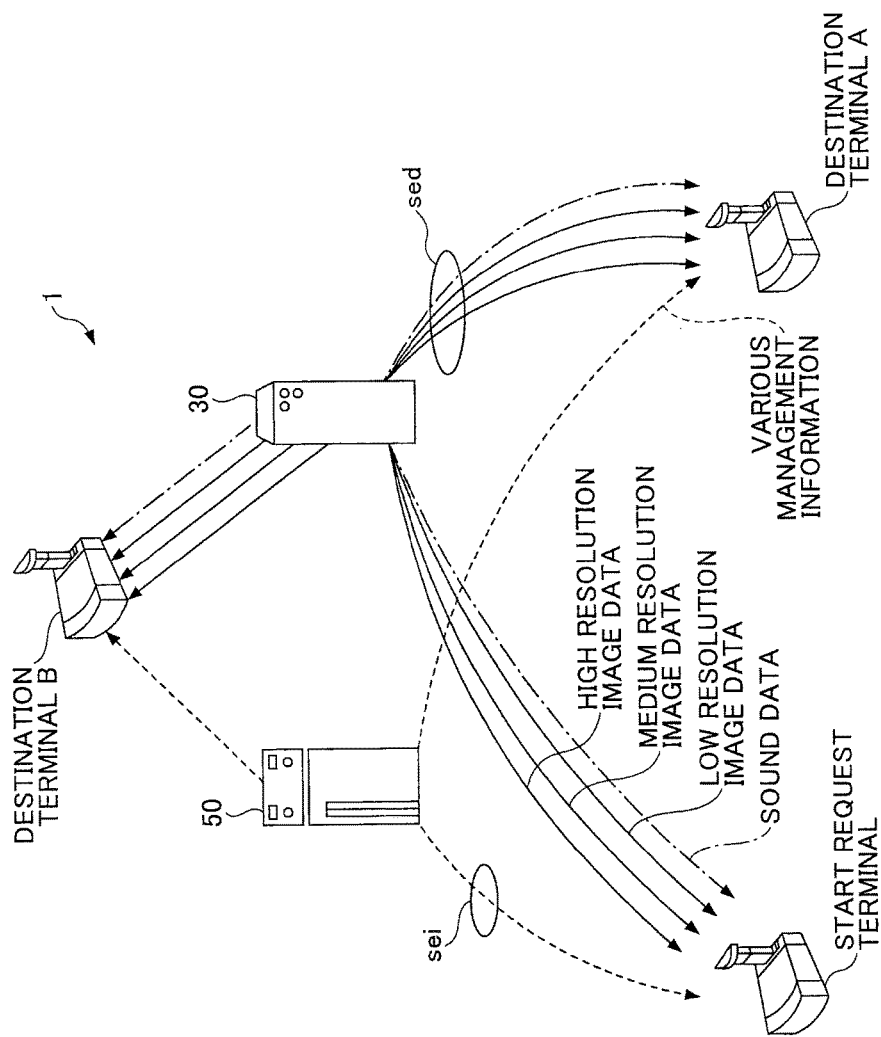
FIG. 20 is a conceptual diagram illustrating states of content data and various management information in the transmission system.

Using FIG. 20, a concept will be described illustrating states of transmission and reception of content data and various management information in the transmission system 1. As shown in FIG. 20, in the transmission system 1, among a start request terminal, a destination terminal A and a destination terminal B, a management information session "sei" for transmitting and receiving various management information via the transmission management system 50 is established. Also, among the start request terminal, the destination terminal A and the destination terminal B, four sessions for transmitting and receiving four types of data, i.e., high resolution image data, medium resolution image data, low resolution image data and sound data, are established via the relay apparatus 30. These 4 sessions are generally referred to as a content data session "sed". In other words, a content data session "sed" is a session used for a video conference.

<Participant Prior Confirmation Setting>

Figure 21:
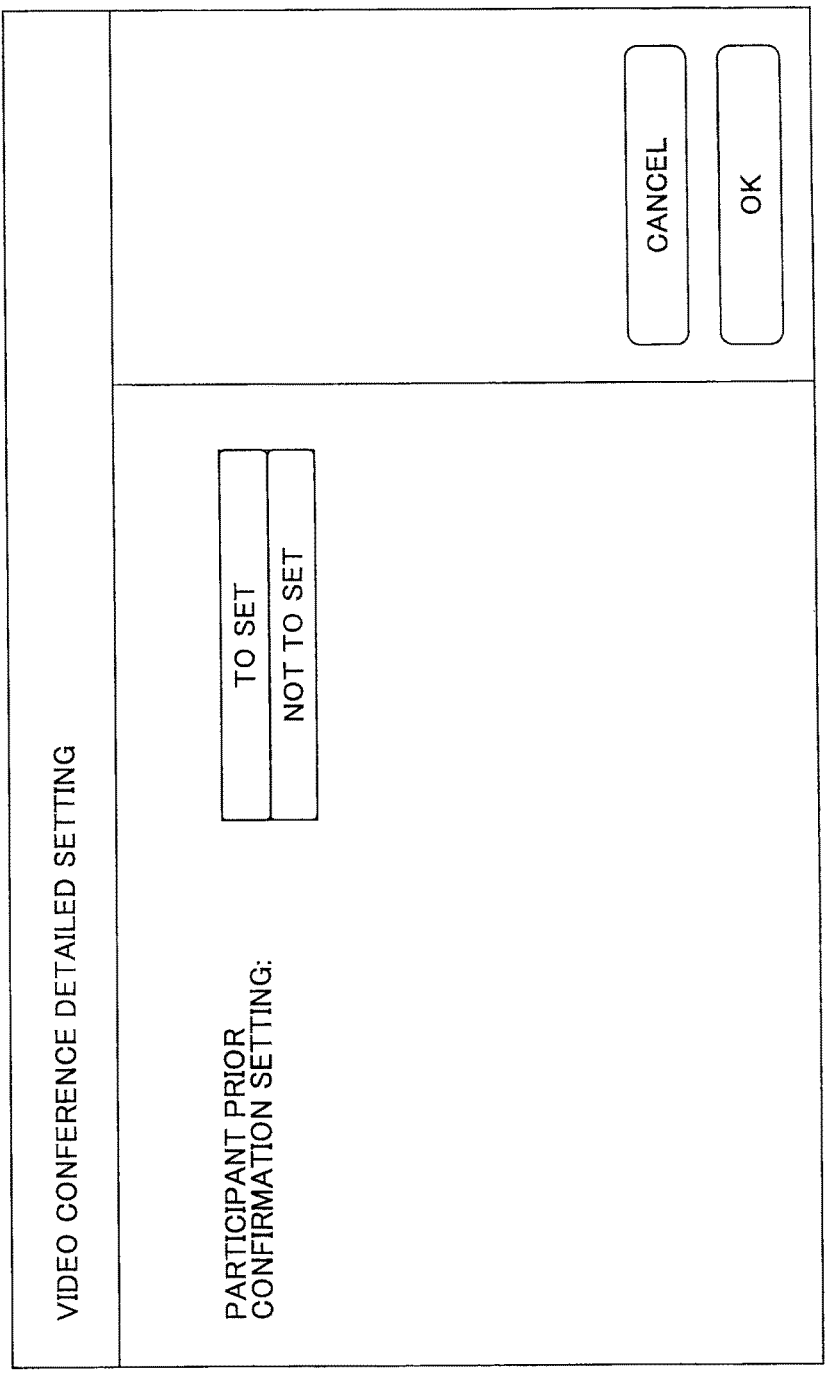
FIG. 21 illustrates one example of a screen page for a participant prior confirmation setting.

FIG. 21 illustrates one example of a screen page for a participant prior confirmation setting.

From a user interface (UI) as shown in FIG. 21, by selecting "TO SET", it is possible to activate an operation of carrying out prior confirmation of conference participants (i.e., participation terminals) when selecting a destination from a destination list screen page. By selecting "NOT TO SET", an operation transition similar to an existing video conference is carried out, and thus, an operation of prior confirmation will not be carried out. Note that, the contents thus set from the UI of FIG. 21 are stored in the nonvolatile storage part 1000 (see FIG. 5) of the transmission terminal 10.

<Display of Destination List>

Figure 22:
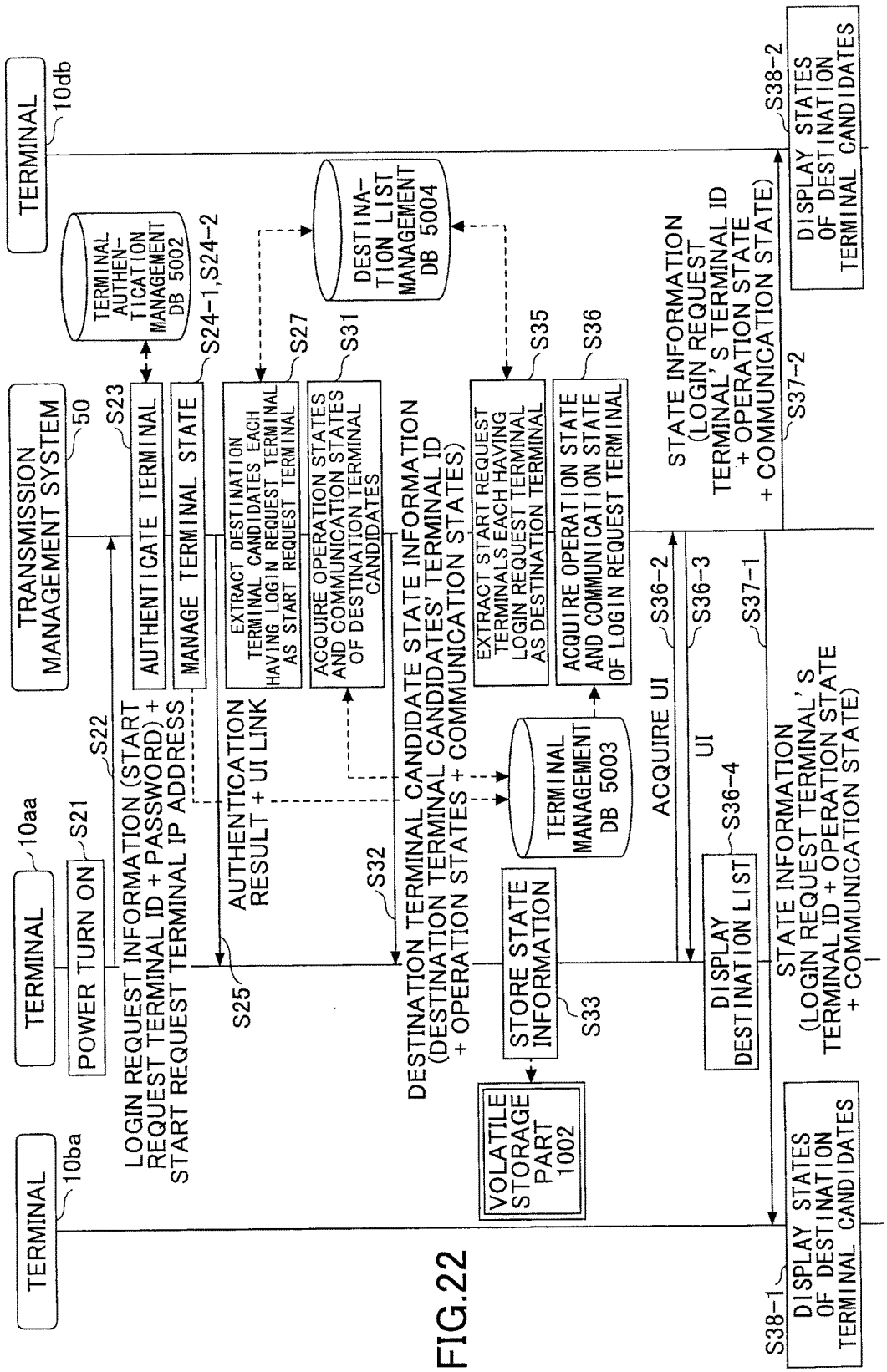
FIG. 22 is a sequence diagram illustrating one example of the process from the power being turned on to a destination list being displayed in a transmission terminal.

FIG. 22 is a sequence diagram illustrating one example of the process from when the power is turned on in the transmission terminal 10 to the destination list is displayed.

In FIG. 22, when the user of the transmission terminal 10*aa* turns on the power switch 109 (see FIG. 2), the operation input reception part 12 (see FIG. 5) receives the turning-on operation and turns on the power (Step S21). Then, in response to the reception of the turning-on operation, the login request part 13 automatically transmits login request information from the communication part 11 to the transmission management system 50 via the communication network 2 indicating a login request (Step S22). The login request information includes the terminal ID for identifying the transmission terminal 10*aa* (the own transmission terminal) that is the request source and the password. The terminal ID and the password are data read out from the nonvolatile storage part 1000 via the storing and reading process part 19 and are transmitted to the communication part 11. Note that, when the transmission terminal 10*aa* thus transmits the login request information to the transmission management system 50, the transmission management system 50 at the reception side can know the IP address of the transmission terminal 10*aa* at the transmission side.

Next, the terminal authentication part 52 of the transmission management system 50 searches the terminal authentication management table (see FIG. 9) of the nonvolatile storage part 5000 using the terminal ID and the password included in the login request information received via the communication part 51 as a search key, thus determining whether the same terminal ID and password are managed in the terminal authentication management DB 5002, and carries out terminal authentication (Step S23).

When it has been determined that the login request is one sent from the transmission terminal 10*aa* having legitimate use authority as a result of a determination that the terminal authentication part 52 manages the same terminal ID and the password, the state management part 53 stores, for the record of the transmission terminal 10*aa* identified by its terminal ID and terminal name, the date/time of having received the login request information and the IP address of the transmission terminal 10*aa* in a manner of associating them in the terminal management table (see FIG. 10) (Step S24-1).

Next, the state management part 53 sets the operation state "on line" and the communication state "None" of the transmission terminal 10*aa*, and stores, in the terminal management table, for the record of the transmission terminal 10*aa* identified by its terminal ID and terminal name, the operation state and the communication state in a manner of associating them (Step S24-2).

Then, the communication part 51 of the transmission management system 50 transmits authentication result information indicating the authentication result acquired by the terminal authentication part 52 and a UI link for displaying the destination list to the login request terminal (the transmission terminal 10*aa*) having transmitted the login request via the communication network 2 (Step S25). Description will now be continued for the case where, in the transmission system 1, terminal authentication part 52 determined that the login request terminal has the legitimate use authority.

Next, the terminal extraction part 54 searches the destination list management table (see FIG. 11) using the terminal ID "01aa" of the login request terminal (the transmission terminal 10*aa*) having made the login request as a search key, and reads and extracts the terminal IDs of the destination terminal candidates, with which the login request terminal (the transmission terminal 10*aa*) is eligible to carry out a conversation as a start request terminal, i.e., eligible to establish a session (Step S27). Also, the terminal extraction part 54 searches the terminal management table using the thus extracted terminal IDs as search keys, and reads and extracts the terminal names corresponding to the terminal IDs, i.e., the terminal names of the destination terminal candidates.

The terminal state acquisition part 55 of the transmission management system 50 searches the terminal management table using the terminal IDs of the destination terminal candidates thus extracted by the terminal extraction part 54 as search keys, reads the corresponding operation states and communication states for the respective terminal IDs extracted by the terminal extraction part 54 and thus acquires the respective operation states and communication states of the respective transmission terminals as the destination terminal candidates (Step S31).

Next, the communication part 51 transmits the terminal IDs used in Step S31 as the search keys and state information including the operation states and the communication states of the corresponding destination terminal candidates to the login request terminal via the communication network 2 (Step S32). Specifically, in Step S32, the communication part 51 transmits the terminal ID "01ab" as the search key and the state information including the operation state "off line" of the destination terminal candidate (the transmission terminal 10*ab*) to the login request terminal (the transmission terminal 10*aa*). Note that, when the operation state is "off line", the state information does not includes the communication state. Also in Step S32, the communication part 51 transmits the terminal ID "01ba" and the state information including the operation state "on line" and the communication state "Private Calling" of the corresponding destination terminal candidate (the transmission terminal 10*ba*), and so forth, and thus, transmits the state information of all the destination terminal candidates to the login request terminal (the transmission terminal 10*aa*).

Next, the storing and reading process part 19 of the login request terminal (the transmission terminal 10*aa*) stores the state information thus received in sequence from the transmission management system 50 in the volatile storage part 1002 (Step S33). Thus, the login request terminal (the transmission terminal 10*aa*) receives the state information of the respective transmission terminals, and thus, can acquire the respective current operation states and communication states of the destination terminal candidates, such as the transmission terminal 10*ab*, eligible to carry out conversations with the login request terminal (the transmission terminal 10*aa*) as the start request terminal.

Next, the terminal extraction part 54 of the transmission management system 50 searches the destination list management table using the terminal ID "01aa" of the login request terminal (the transmission terminal 10*aa*) as a search key, and extracts the terminal IDs of the other transmission terminals (the start request terminals) each of which registers the terminal ID "01aa" of the login request terminal (transmission terminal 10*aa*) as a destination terminal candidate (Step S35).

Next, the terminal state acquisition part 55 of the transmission management system 50 searches the terminal management table using the terminal ID "01aa" of the login request terminal (the transmission terminal 10*aa*) as a search key, and acquires the operation state and the communication state of the login request terminal (the transmission terminal 10*aa*) (Step S36).

Next, the display control part 16 of the transmission terminal 10*aa* acquires the UI based on the UI link acquired when having acquired the authentication result information from the transmission management system 50 (Step S36-2), thus acquires the UI (display data described according to a structured language such as HTML) (Step S36-3), and displays the destination list (Step S36-4).

Next, the communication part 51 of the transmission management system 50 transmits, to the transmission terminal(s) having the operation state(s) "on line" in the terminal management table from among the transmission terminals of the terminal IDs extracted in Step S35, the terminal ID "01aa" and the state information including the operation state "on line" and the communication state "None" of the login request terminal (the transmission terminal 10*aa*) acquired in Step S36 (the transmission terminal 10*aa*) (Step S37-1, S37-2). Next, the transmission terminal 10*ba* and the transmission terminal 10*db* display the state information of the destination terminal candidates on their display devices 120, respectively (Steps S38-1 and S38-2). Note that, when the communication part 51 is to transmit the state information to the transmission terminals (10*ba* and 10*db*), the communication part 51 reads the IP addresses of the transmission terminals managed in the terminal management table based on the respective terminal IDs ("01ba" and "01db"). Thus, it is possible to transmit, to the respective transmission terminals (transmission terminals (10*ba* and 10*db*)) eligible to carry out conversations with the login request terminal (the transmission terminal 10*aa*) as the destination, the terminal ID "01aa" of the login request terminal (the transmission terminal 10*aa*) and its operation state "on line" and its communication state "None".

On the other hand, in the other transmission terminals 10, in the same way as Step S21, when the users turn on the power switches 109, the operation input reception parts 12 receive the turning-on operations and carry out the same process as Steps S22-S38-1 and S38-2. Thus, the duplicate description will be omitted.

Figure 23:
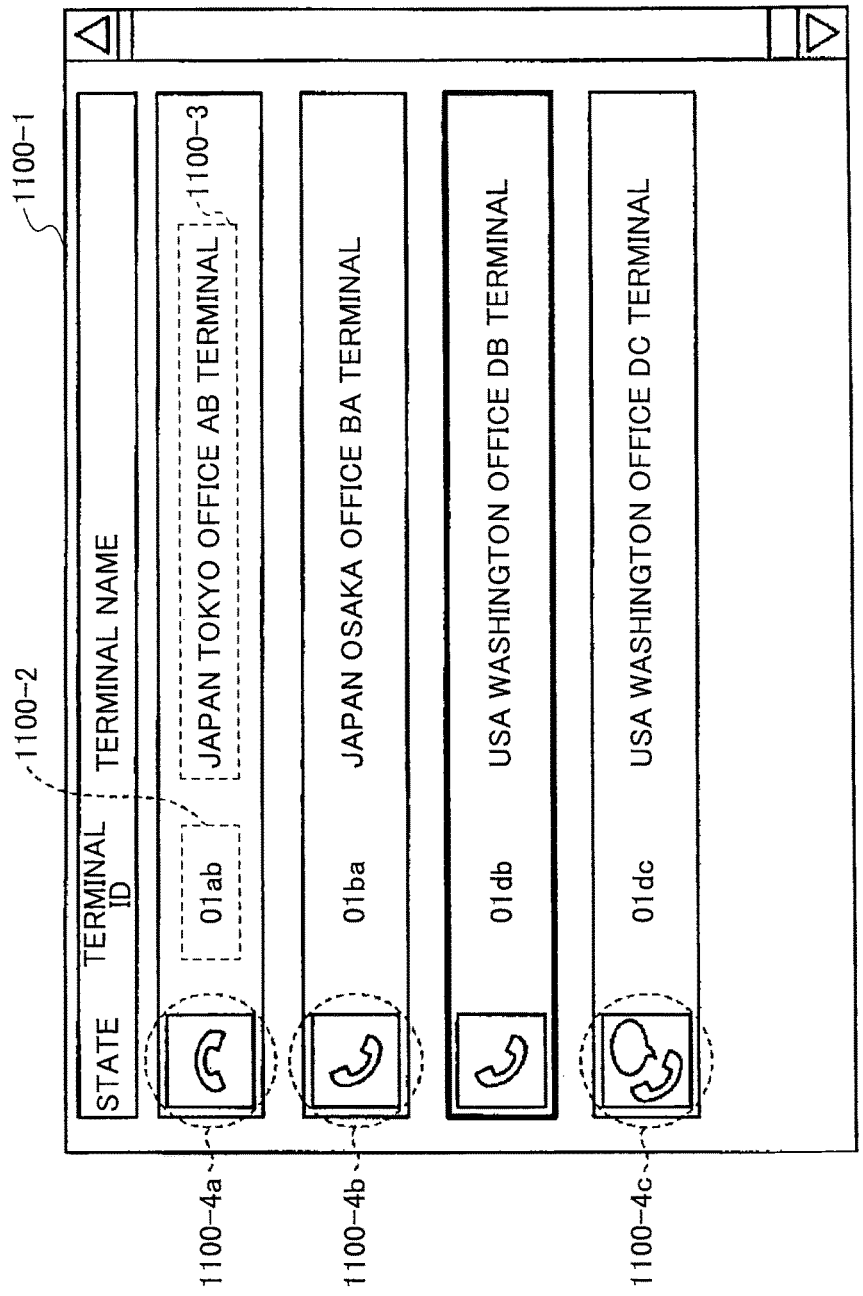
FIG. 23 illustrates one example of display of the destination list.

FIG. 23 illustrates one example of displaying the destination list displayed on a transmission terminal 10.

In FIG. 23, in the destination list, a destination list frame 1100-1 includes the terminal IDs 1100-2, the terminal names 1100-3 and icons 1100-4*a*, 1100-4*b*, 1100-4*c* and so forth reflecting the state information of the destination terminal candidates.

As the icons, an "off line" icon 1100-4*a* representing a state of "off line" and not eligible to carry out a conversation, a conversation-enable icon 1100-4*b* representing a state of "on line" and eligible to carry out a conversation and an on-conversation icon 1100-4*c* representing an on-conversation state of currently carrying out a conversation are used.

When the operation state of the destination terminal candidate is "on line" and its communication state is "None", the display control part 16 assigns the conversation-enable icon 1100-4*b* to the destination terminal candidate based on the UI. Also, when the operation state of the destination terminal candidate is "on line" and its communication state is other than "None", the display control part 16 assigns the on-conversation icon 1100-4c to the destination terminal candidate. Also, when the operation state of the destination terminal candidate is "off line", the display control part 16 assigns the off-line icon 1100-4a to the destination terminal candidate.

Note that although the case where the UI is acquired from the transmission management system 50 has been described, it is also possible that the UI is acquired from a UI management apparatus provided separate from the transmission management system 50 based on the UI link.

<Another Process Example of Displaying Destination List>

In the process example shown in FIG. 22, in prior to displaying the destination list (Step S36-4), the transmission terminal acquires the UI (Steps S36-2 and S36-3). Therefore, it is not necessary to change the information inside the transmission terminal even when the UI is changed. However, if the transmission terminal itself has a failure, a labor is needed to store the terminal ID in an alternative machine since the terminal ID is stored in the transmission terminal itself. Unless the terminal ID is not stored in the alternative machine, the alternative machine cannot acquire the UI and cannot display the destination list.

Therefore, in another process example, the terminal ID is managed by an authentication server, and, when the transmission terminal is started, it acquires the terminal ID from the authentication server. Thereby, even when the transmission terminal has a failure, it is not necessary to change the internal information of an alternative machine. Thus, it is possible to remarkably reduce the labor to replace the information.

Figure 24:
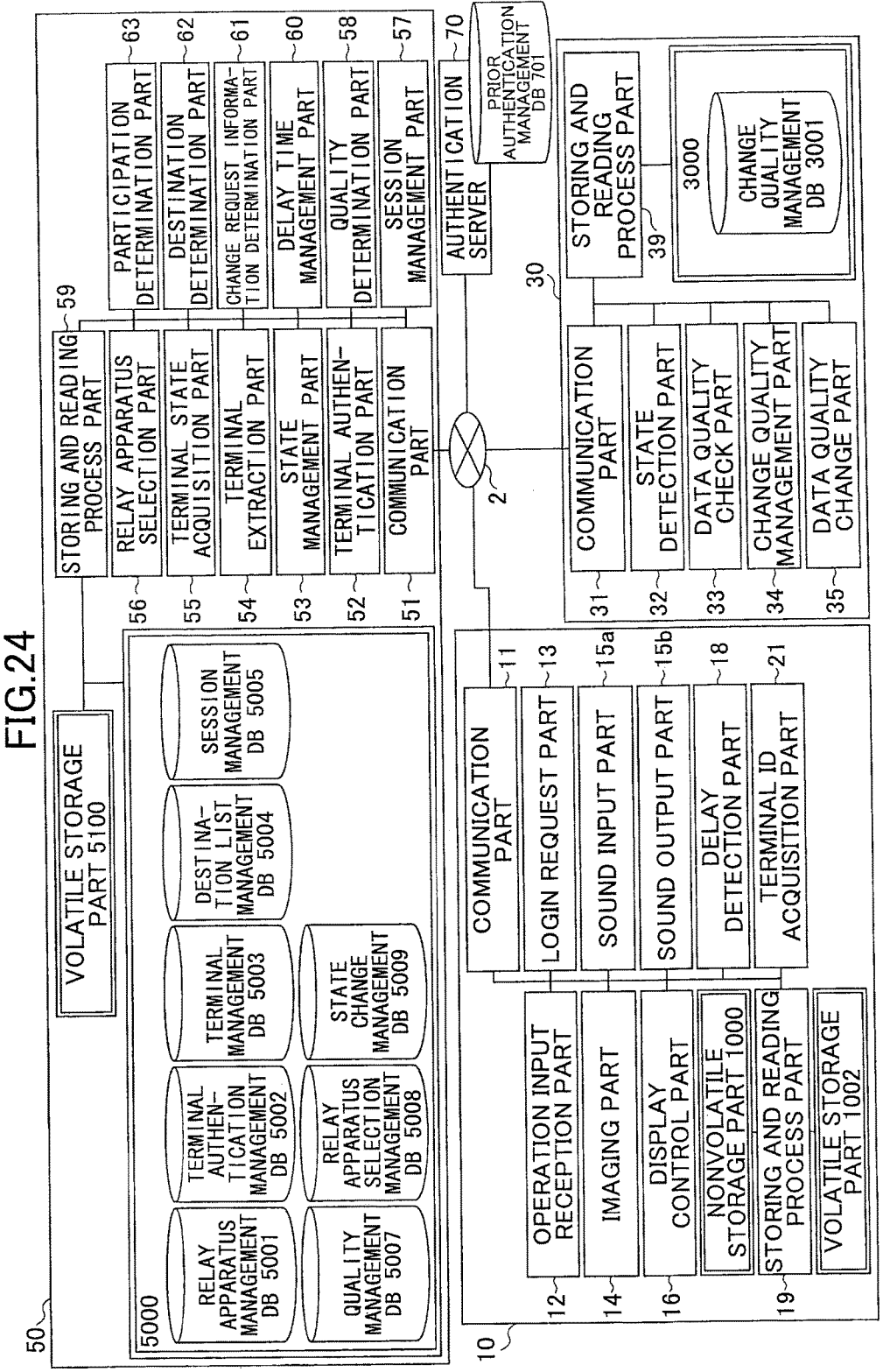
FIG. 24 is a functional block diagram of each transmission terminal, apparatus and system included in the transmission system.

FIG. 24 is a functional block diagram illustrating each transmission terminal, apparatus and system included in the transmission system corresponding to the other process example of displaying the destination list. In FIG. 24, the transmission terminal 10 newly includes a terminal ID acquisition part 21, and the authentication server 70 having a prior authentication management DB 701 is connected to the communication network 2. The terminal ID acquisition part 21 of the transmission terminal 10 has a function of accessing the authentication server 70 at a time of starting and acquiring the terminal ID based on information that is set in the prior authentication management DB 701. FIG. 25 illustrates one example of a prior authentication management table stored in the prior authentication management DB 701 of the authentication server 70. As shown, in the prior authentication management table, a machine number unique to each transmission terminal and the terminal ID previously assigned to the transmission terminal are associated.

Figure 26:
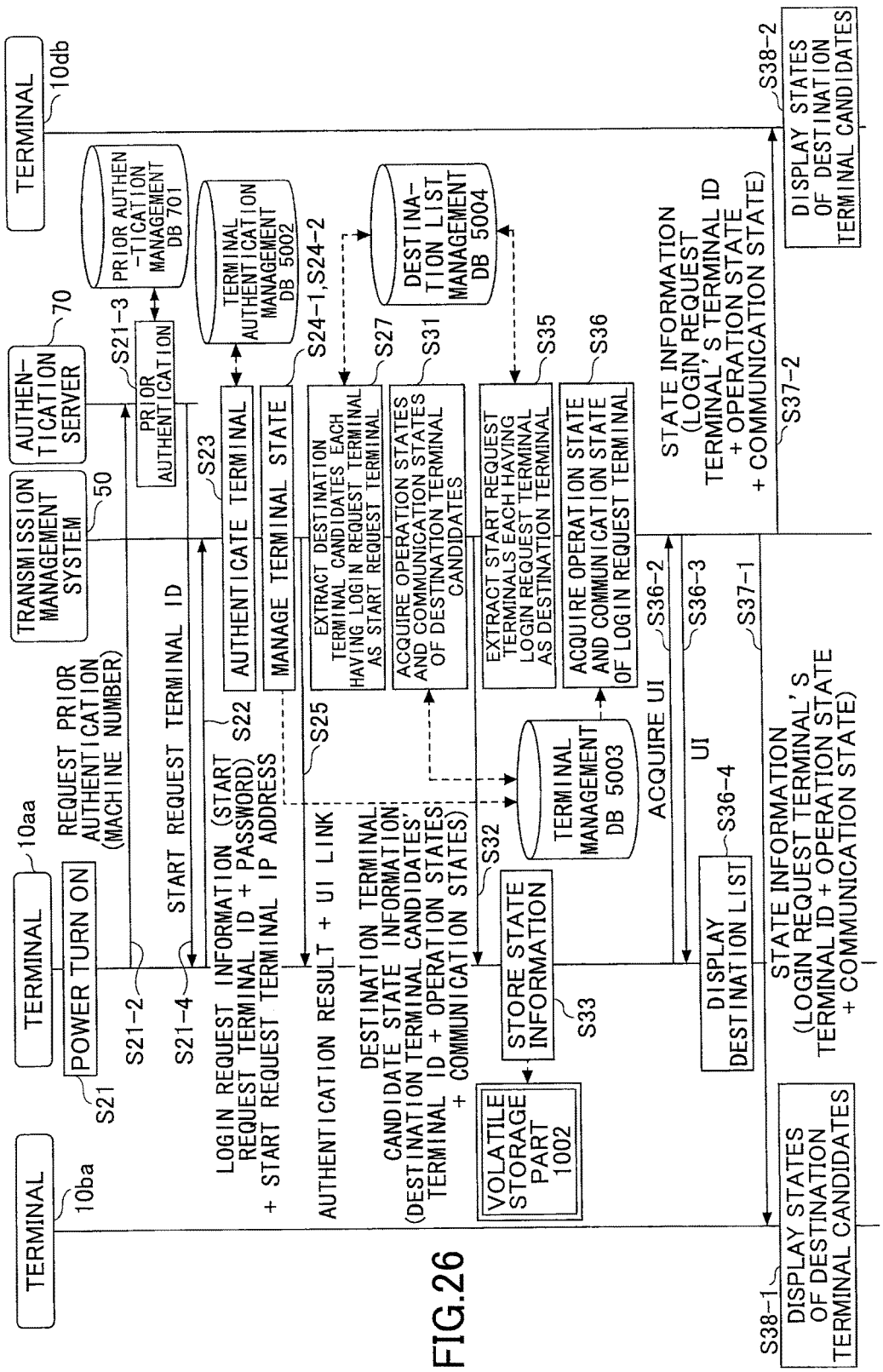
FIG. 26 is a sequence diagram illustrating another example of the process from the power being turned on to a destination list being displayed in a transmission terminal.

FIG. 26 is a sequence diagram illustrating the other process example from when the power is turned on in the transmission terminal to when the destination list is displayed. In FIG. 26, when the user of the transmission terminal 10aa turns on the power switch 109, the operation input reception part 12 receives the turning-on operation and turns on the power (Step S21).

Next, the terminal ID acquisition part 21 of the transmission terminal 10aa makes a prior authentication request along with the unique machine number previously assigned to the own terminal to the authentication serve 70 from the communication part 11 via the communication network 2 in response to the reception of the turning-on operation (Step S21-2).

The authentication server 70 reads the prior authentication management table of the prior authentication management DB 701 to determine whether the machine number included in the prior authentication request from the transmission terminal is included. When the prior authentication management table includes the same machine number, the authentication server 70 acquires the corresponding terminal ID (Step S21-3). Then, the authentication server 70 returns the acquired terminal ID to the transmission terminal 10aa of the request source as the start request terminal ID (Step S21-4). The process thereafter is the same as the process starting from Step S22 of FIG. 22 and the duplicate description will be omitted.

Note that, in FIGS. 24 and 26, the authentication server 70 is shown separate to the transmission management system 50. However, it is also possible that the authentication server 70 is a part of the transmission management system 50. When the authentication server 70 is provided separate to the transmission management system 50, it is advantageously possible to distribute the processing load of the transmission management system 50.

<Conference Participant Prior Confirmation>

Figure 27:
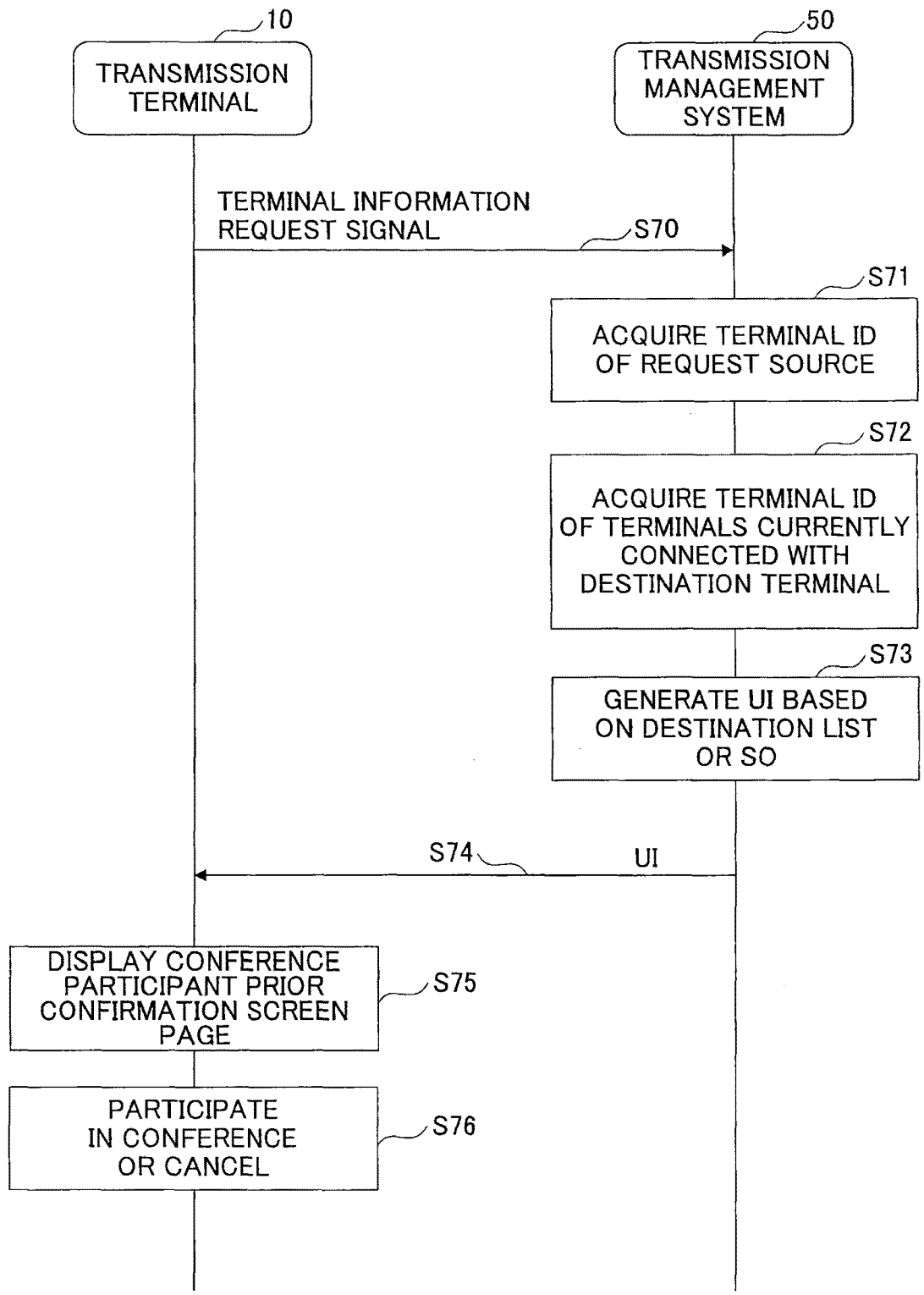
FIG. 27 is a sequence diagram illustrating one example of the process of participant prior confirmation.

FIG. 27 is a sequence diagram illustrating one process example of participant prior confirmation.

In FIG. 27, when the user of a transmission terminal 10 selects a destination from the destination list, if the participant prior confirmation setting indicates "TO SET" (see FIG. 21), the transmission terminal 10 transmits, to the transmission management system 50, a terminal information request signal indicating a request to acquire information concerning transmission terminals that are participating in a video conference (including the thus selected transmission terminal (the destination) and the other transmission terminal(s) which is in a state of transmitting and receiving data and information therewith) (Step S70).

The terminal state acquisition part 55 of the transmission management system 50 having received the terminal information request signal searches the fields of "IP ADDRESS OF TRANSMISSION TERMINAL" of the terminal management table (see FIG. 10)" using the IP address of the transmission source of the terminal information request signal as a search key to acquire the terminal ID included in the corresponding record, and thus acquires the terminal ID of the transmission terminal 10 that has transmitted the terminal information request signal (Step S71).

Next, the terminal state acquisition part 55 searches the fields of "START REQUEST TERMINAL ID" and "DESTINATION TERMINAL ID" of the session management table (see FIG. 12) using the terminal ID of the destination terminal selected by the user of the transmission terminal 10 having transmitted the terminal information request signal as a search key and acquires the terminal IDs of the transmission terminals that are currently connected with the destination terminal (Step S72). As to duplicate terminal IDs, if any, only one thereof is left. Note that the information of the destination terminal is included in the terminal information request signal in Step S70 or, in prior thereto, is already sent to the transmission management system 50.

Next, the terminal state acquisition part 55 generates a UI based on the destination list (created when the destination is designated at the side of the transmission terminal) or the destination list management table (see FIG. 11) (Step S73). The details will be described later.

Then, the transmission management system 50 transmits the thus generated UI to the transmission terminal 10 that is the request source (Step S74). This process of transmitting the UI is carried out subsequent to the previous process of transmitting the destination list based on the UI link (see Steps S36-2 and S36-3 of FIG. 22).

In response to receiving the UI, the transmission terminal 10 displays a conference participant prior confirmation screen page based on the UI (Step S75).

The user reads the displayed conference participant prior confirmation screen page and determines whether to continue the process to participate in the video conference or cancels the participation in the video conference (Step S76).

Figure 28:
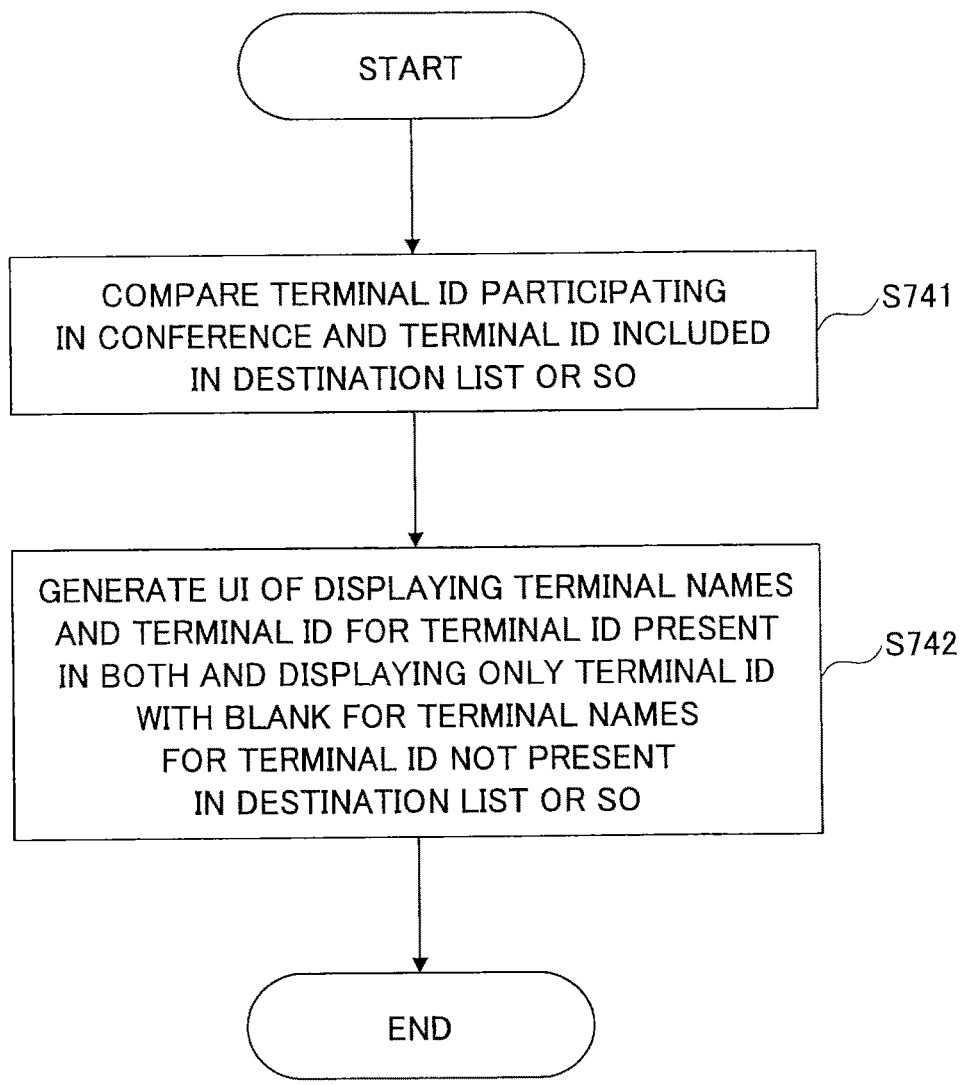

FIG. 28 illustrates one example of the process of generating the UI based on the destination list or so (see Step S73 in FIG. 27).

In FIG. 28, the transmission management system 50 compares the terminal IDs participating in the video conference (i.e., the terminal IDs of the transmission terminals that are currently connected with the destination terminal acquired in Step S72) and the terminal IDs included in the destination list created when the destination is designated or the terminal IDs of the destination terminals associated with the request source terminal in the destination list management table (Step S741).

Next, the transmission management system 50 generates the UI in such a manner as to display the terminal names and the terminal IDs for the terminal IDs included in both the terminal IDs participating in the video conference and the destination list or so, while, for the terminal IDs not included in the destination list or so, the terminal names are made blank and only the terminal IDs are displayed (Step S742).

FIG. 29 shows one example of the conference participant prior confirmation screen page displayed based on the thus generated UI. In the example shown, as the conference participants (i.e., the conference participation terminals), three transmission terminals are displayed, where, for the first and third transmission terminals, the terminal names and the terminal IDs are displayed, while, for the second transmission terminal, the terminal ID is displayed but the terminal name is made blank, whereby it is possible to know that the video conference is the conference where the transmission terminal not registered in the destination list of the own transmission terminal participates in. After thus understanding this situation, the user presses the "OK" button for participating in the video conference (entering the room), or pressing the "CANCEL" button for canceling participating in the video conference.

Figure 30:
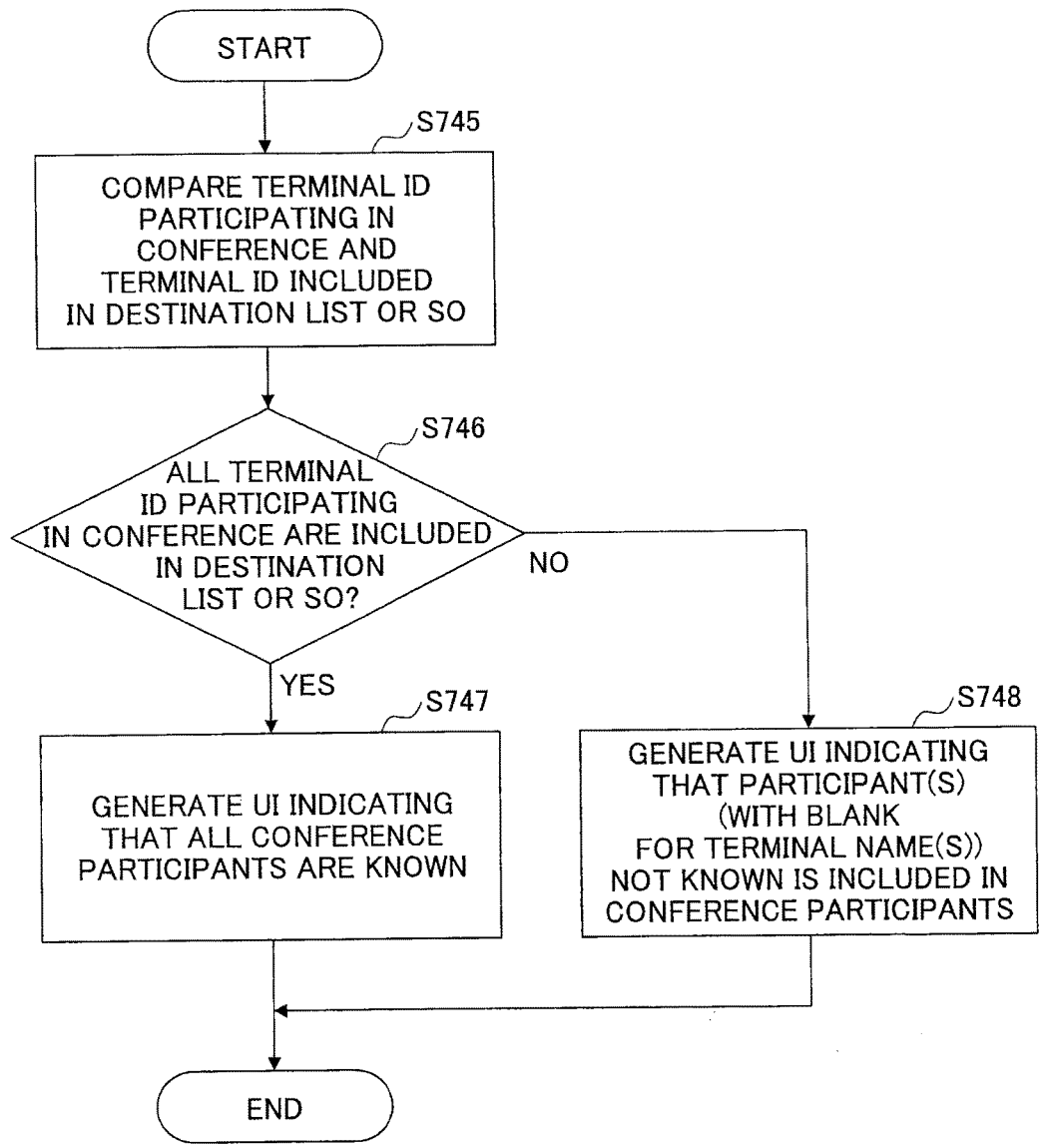

FIG. 30 illustrates another example of the process of generating the UI based on the destination list or so (Step S73 in see FIG. 27).

In FIG. 30, the transmission management system 50 compares the terminal IDs participating in the video conference (i.e., the terminal IDs of the transmission terminals that are currently connected with the destination terminal acquired in Step S72) and the terminal IDs included in the destination list created when the destination is designated or the terminal IDs of the destination terminals associated with the request source transmission terminal in the destination list management table (Step S745).

Next, the transmission management system 50 determines whether all the transmission terminals participating in the video conference are included in the terminal IDs included in the destination list or so, by a process of searching using the terminal IDs as search keys or so (Step S746).

Figure 31:
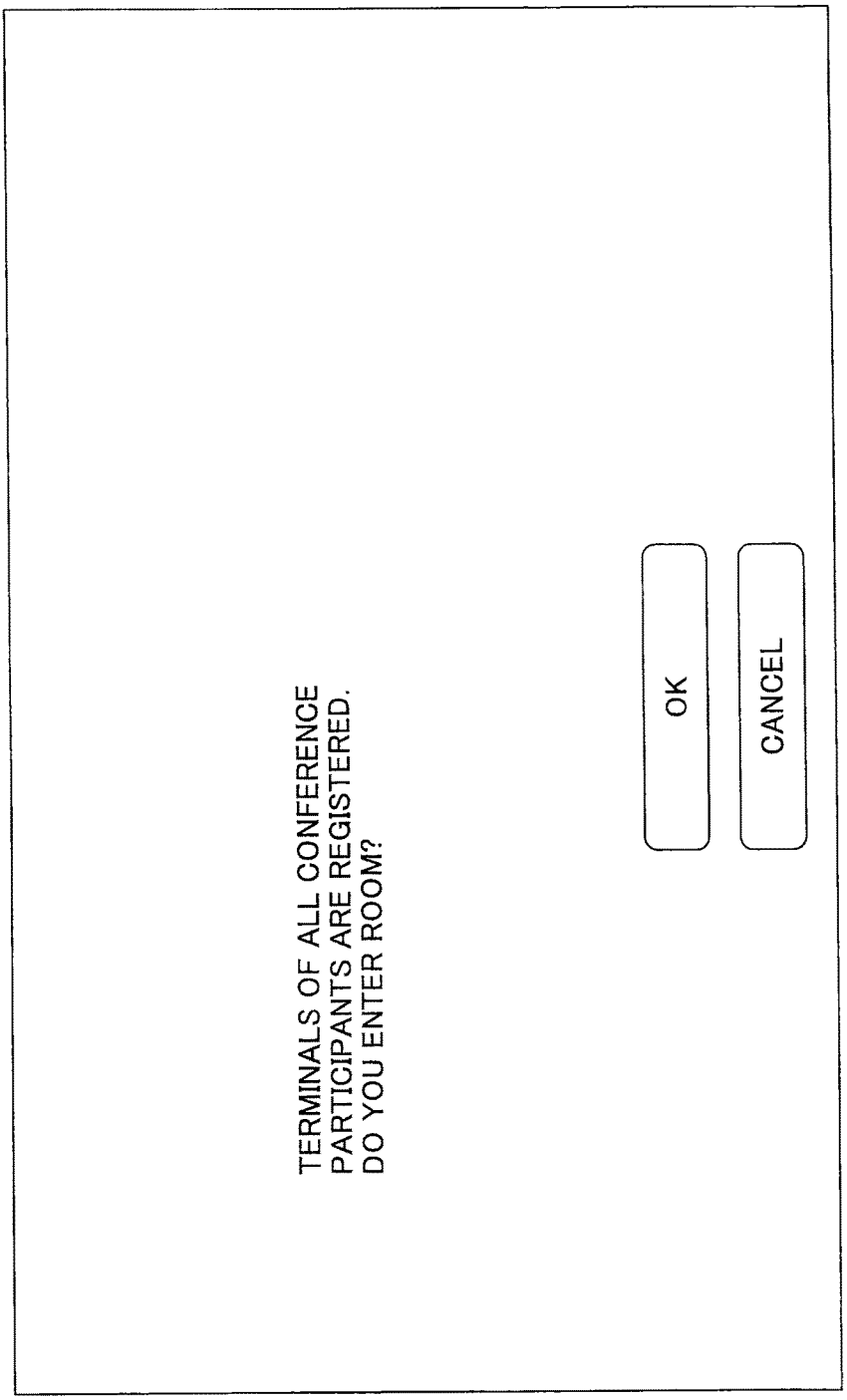
FIG. 31 illustrates another example of a conference participant prior confirmation screen page.

Then, when all the transmission terminals participating in the video conference are included in the terminal IDs included in the destination list or so (YES in Step S746), the transmission management system 50 generates the UI in such a manner as to display that all the conference participants are known (Step S747). FIG. 31 illustrates one example of the conference participant prior confirmation screen page displayed based on the thus generated UI. As shown, in the conference participant prior confirmation screen page, a message "TRANSMISSION TERMINALS OF ALL CONFERENCE PARTICIPANTS ARE REGISTERED. DO YOU ENTER ROOM?" is displayed, and an "OK" button and a "CANCEL" button are displayed.

Figure 32:
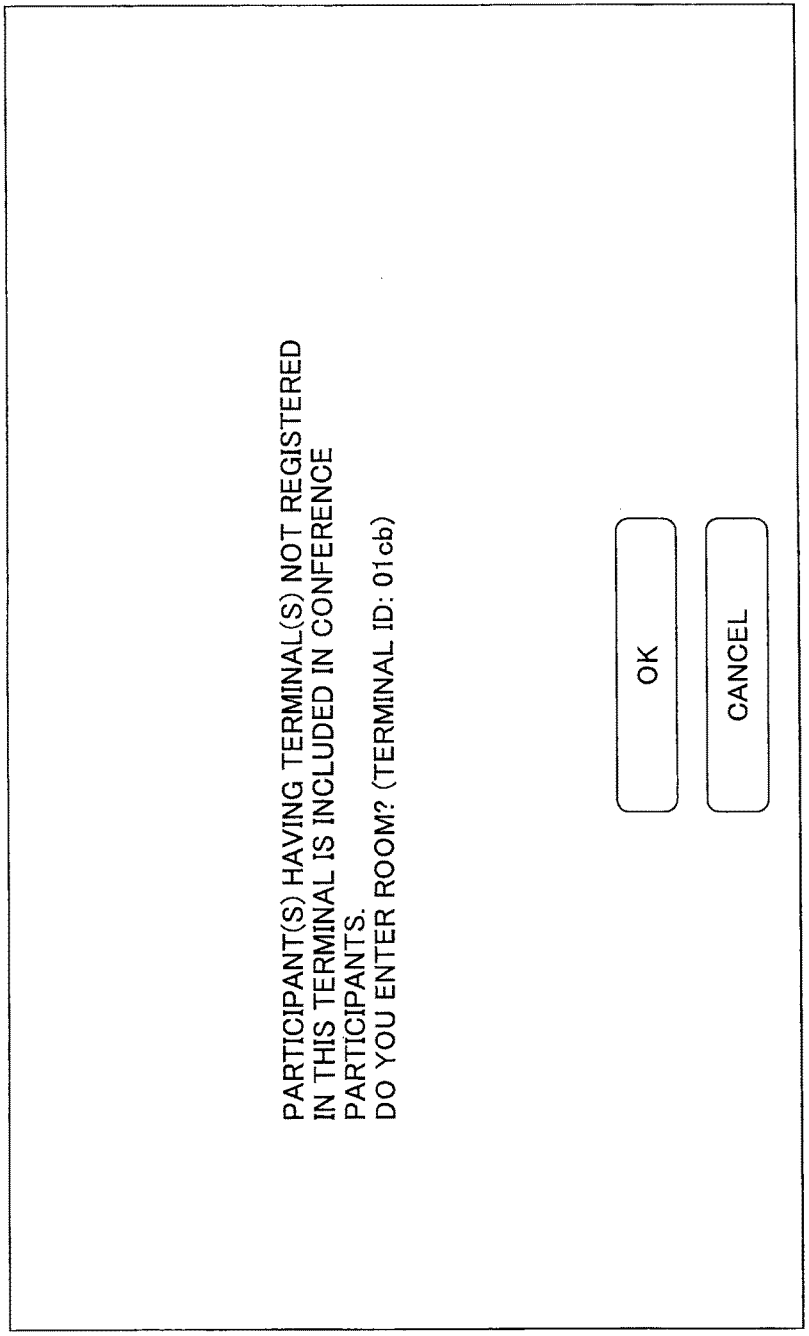
FIG. 32 illustrates yet another example of a conference participant prior confirmation screen page.

Returning to FIG. 30, when any one(s) of the transmission terminals participating in the video conference is(are) not included in the terminal IDs included in the destination list or so (NO in Step S746), the transmission management system 50 generates the UI in such a manner as to display that a conference participant(s) not known (with only the terminal ID(s)) is(are) included (Step S748). FIG. 32 illustrates one example of the conference participant prior confirmation screen page displayed based on the thus generated UI. As shown, in the conference participant prior confirmation screen page, a message "PARTICIPANT HAVING TRANSMISSION TERMINAL NOT REGISTERED IN THIS TRANSMISSION TERMINAL IS INCLUDED IN CONFERENCE PARTICIPANTS. DO YOU ENTER ROOM? (TERMINAL ID: 01cb)" is displayed, and an "OK" button and a "CANCEL" button are displayed.

Another Embodiment

Another embodiment will now be described using FIGS. 33-36.

Basically, the other embodiment has almost the same configurations, functions, processes and operations as those of the embodiment described above using FIGS. 1-32. Therefore, duplicate description for the same configurations, functions, processes and operations as those of the embodiment described above using FIGS. 1-32 will be omitted.

Figure 33:
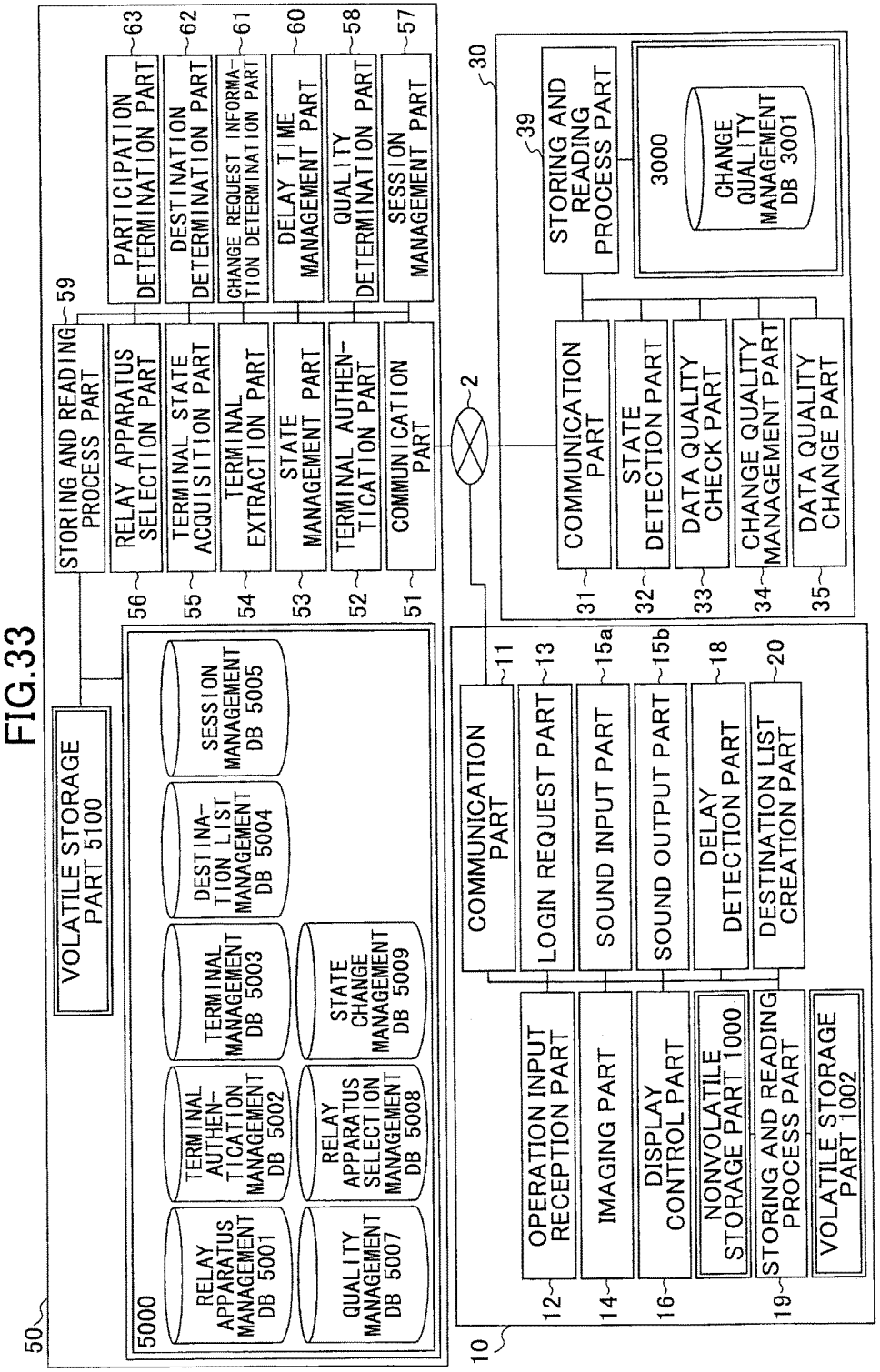
FIG. 33 is a functional block diagram of each transmission terminal, apparatus and system included in a transmission system according to another embodiment.

As shown in FIG. 33, corresponding to FIG. 5, in the other embodiment, a destination list creation part 20 is additionally provided in each transmission terminal 10. Also this part is a function or a part implemented by operations of the CPU 101 according to the program stored in the ROM 102 shown in FIG. 2 of the above-mentioned embodiment.

The destination list creation part 20 creates and updates the destination list as shown in FIG. 23 of the above-mentioned embodiment where the states of the destination candidates are expressed by the icons based on destination list information (described later) and the state information of the transmission terminals 10 as the respective destination candidates received from the transmission management system 50.

Figure 34:
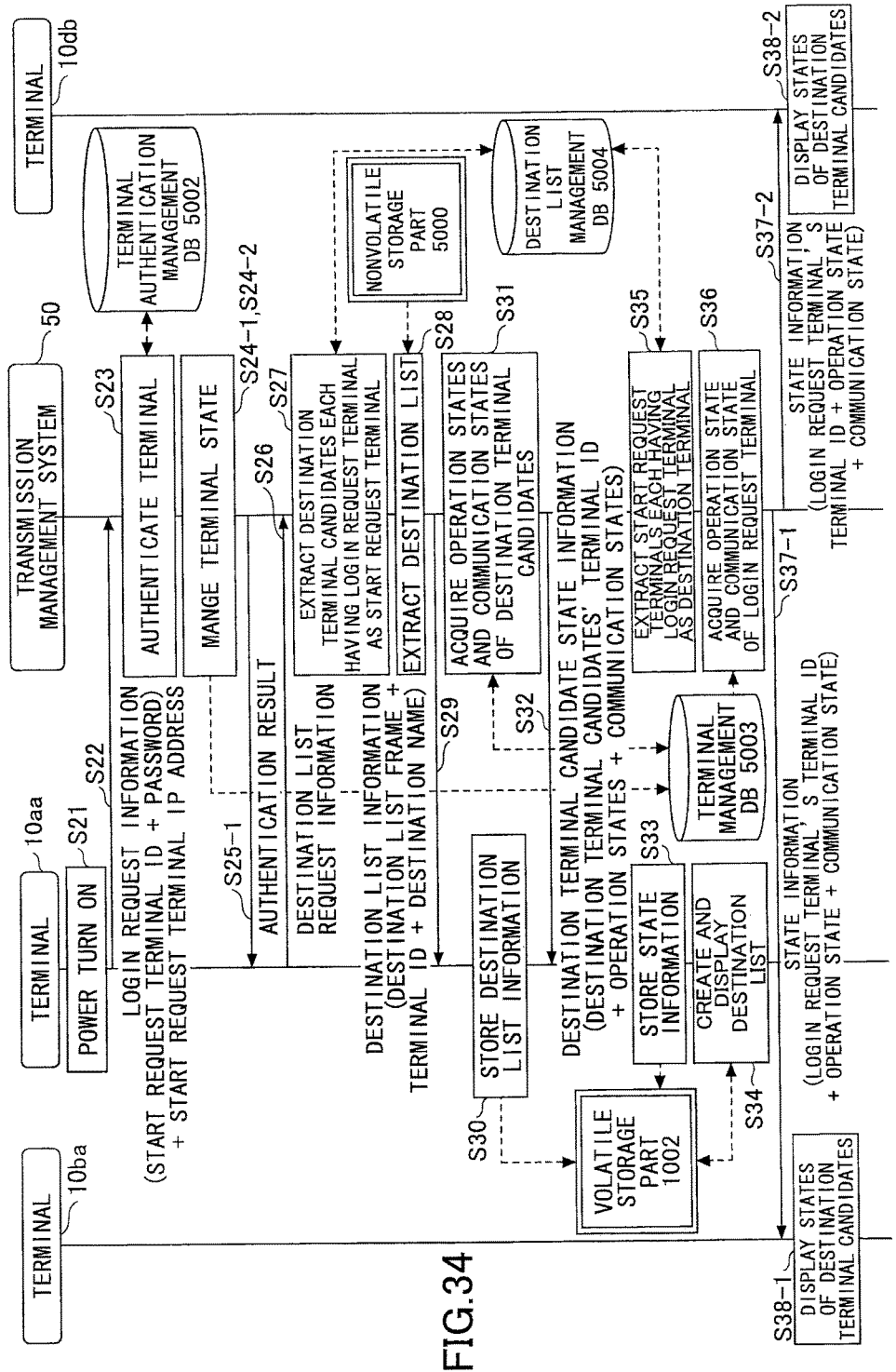
FIG. 34 is a sequence diagram illustrating one example of the process from the power being turned on to a destination list being displayed in a transmission terminal according to the other embodiment.

Concerning the display of the destination list described above for the above-mentioned embodiment using FIG. 22, FIG. 34 corresponds to FIG. 22 in the other embodiment.

In FIG. 34, the process up to Step S24-2 is the same as the above-mentioned embodiment described using FIG. 22.

Then, in Step S25-1, the communication part 51 of the transmission management system 50 transmits authentication result information indicating the authentication result acquired by the terminal authentication part 52 to the login request terminal (the transmission terminal 10*aa*) having transmitted the login request via the communication network 2. Description will now be continued for the case where, in the transmission system 1, terminal authentication part 52 determined that the login request terminal has the legitimate use authority.

Then, after receiving the authentication result information indicating that the transmission terminal 10*aa* is determined to have the legitimate use authority, the communication part 11 of the transmission terminal 10*aa* transmits, to the transmission management system 50 via the communication network 2, destination list request information indicating to request the destination list (Step S26). Thus, the communication part 51 of the transmission management system 50 receives the destination list request information.

Next, the terminal extraction part 54 searches the destination list management table (see FIG. 11 of the above-mentioned embodiment) using the terminal ID "01aa" of the login request terminal (the transmission terminal 10*aa*) having made the login request as a search key, and reads and extracts the terminal IDs of the destination terminal candidates, with which the login request terminal (the transmission terminal 10*aa*) is eligible to carry out a conversation as a start request terminal, i.e., eligible to establish a session (Step S27). Also, the terminal extraction part 54 searches the terminal management table using the thus extracted terminal IDs as search keys, and reads and extracts the terminal names corresponding to the terminal names of the terminal IDs, i.e., the terminal names of the destination terminal candidates.

Next, the communication part 51 of the transmission management system 50 reads data of a destination list frame from the nonvolatile storage part 5000 via the storing and reading process part 59 (Step S28), and transmits "destination list information (the destination list frame, the terminal IDs and the terminal names)" including the destination list frame together with the terminal IDs and the terminal names of the destination terminal candidates extracted by the terminal extraction part 54 to the start request terminal (the transmission terminal 10*aa*) (Step S29). Then, the communication part 11 of the start request terminal (the transmission terminal 10*aa*) receives the destination list information, and the storing and reading process part 19 stores the destination list information in the volatile storage part 1002 (Step S30).

Thus, according to the transmission system 1 in the other embodiment, each transmission terminal 10 does not manage the destination list information but the transmission management system 50 unitarily manages the destination list information of all the transmission terminals. Therefore, even when the transmission system 1 will include a new transmission terminal(s) 10, a new model(s) of a transmission terminal(s) 10 will be used to replace an existing transmission terminal(s), or the appearance of the destination list frame or so will be changed, all of the necessary processes can be carried out at the side of the transmission management system 50 in a lump. Therefore, it is possible to save the labor for changing the destination list information at the side of each transmission terminal 10.

Steps 31-33 are the same as those of the above-mentioned embodiment described above using FIG. 22.

Next, the destination list creation part 20 of the login request terminal (the transmission terminal 10*aa*) creates the destination list reflecting the operation states and the communication states of the transmission terminals 10 as the destination terminal candidates based on the destination list information and the state information of the transmission terminals stored in the volatile storage part 1002. Then, the display control part 16 displays the destination list on the display device 120*aa* (see FIG. 1) at predetermined timing (Step S34).

Steps S35-S36, Steps S37-1 and S37-2 and Steps S38-1 and S38-2 are the same as those of the above-mentioned embodiment described using FIG. 22 while Steps S36-2, S36-3 and S36-4 shown in FIG. 22 are not included.

FIG. 23 of the above-mentioned embodiment also illustrates one example of displaying the destination list displayed on a transmission terminal 10 in the other embodiment.

In the other embodiment, when the operation state of the destination terminal candidate is "on line" and its communication state is "None", the destination list creation part 20 assigns the conversation-enable icon 1100-4*b* to the destination terminal candidate. Also, when the operation state of the destination terminal candidate is "on line" and its communication state is other than "None", the destination list creation part 20 assigns the on-conversation icon 1100-4*c* to the destination terminal candidate. Also, when the operation state of the destination terminal candidate is "off line", destination list creation part 20 assigns the off-line icon 1100-4*a* to the destination terminal candidate.

<Conference Participant Prior Confirmation>

Figure 35:
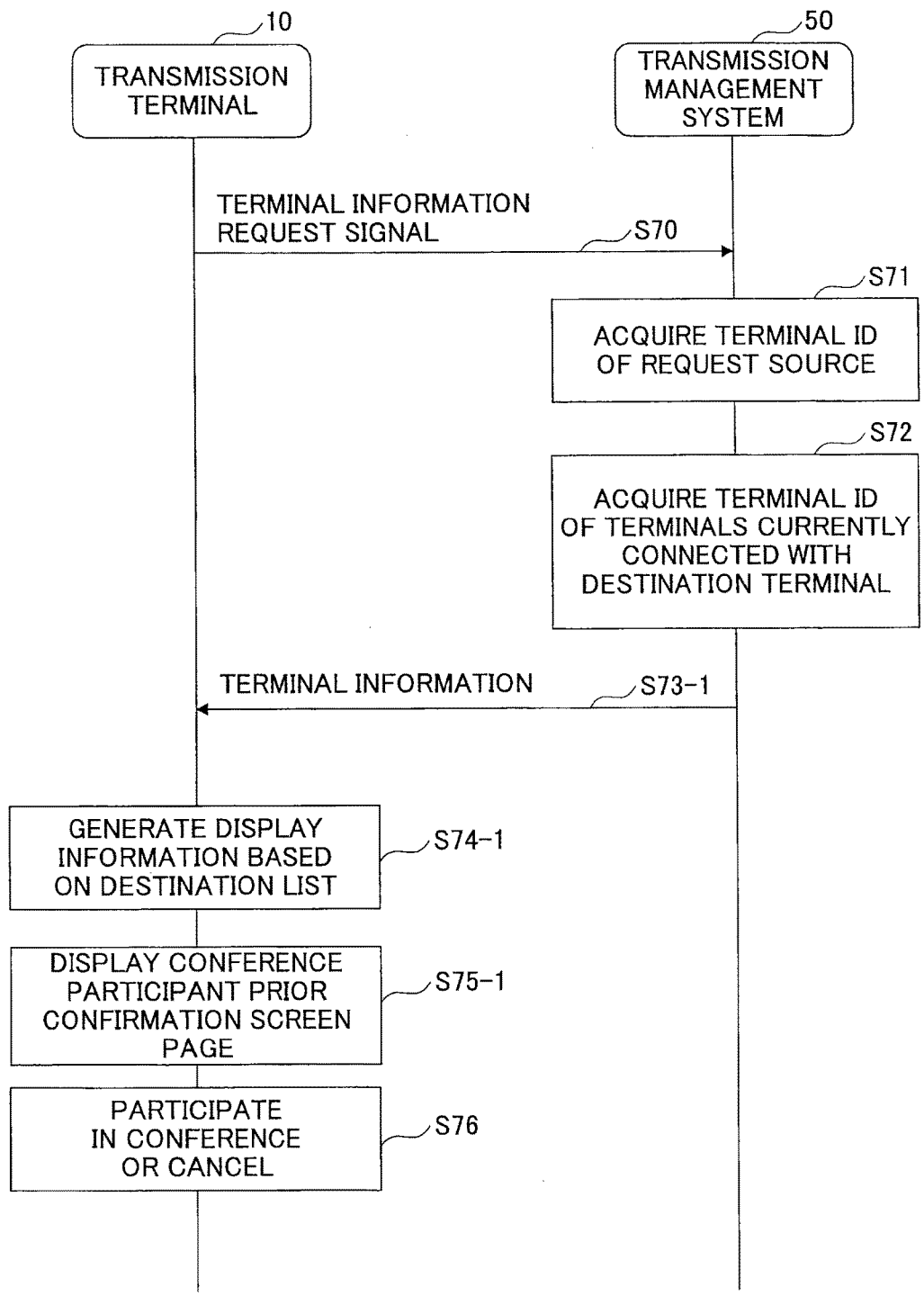
FIG. 35 is a sequence diagram illustrates one example of the process for conference participant prior confirmation according to the other embodiment.

FIG. 35 is a sequence diagram illustrating one example of participant prior confirmation according to the other embodiment.

In FIG. 35, Steps S70-S72 are the same as those of the above-mentioned embodiment described using FIG. 24.

Then, the transmission management system 50 transmits terminal information including the terminal IDs of the transmission terminals that are currently connected with the destination terminal acquired in Step S72 to the transmission terminal 10 that is the request source (Step S73-1).

In response to receiving the terminal information, the transmission terminal 10 generates display information based on the destination list (created when the destination is designated at the side of the transmission terminal) (Step S74-1). Details thereof will be described later.

In response to receiving the display information, the transmission terminal 10 displays a conference participant prior confirmation screen page based on the display information (Step S75-1).

The user reads the conference participant prior confirmation screen page and determines whether to continue the process to participate in the video conference participation or cancels the participation in the video conference (Step S76).

Figure 36:
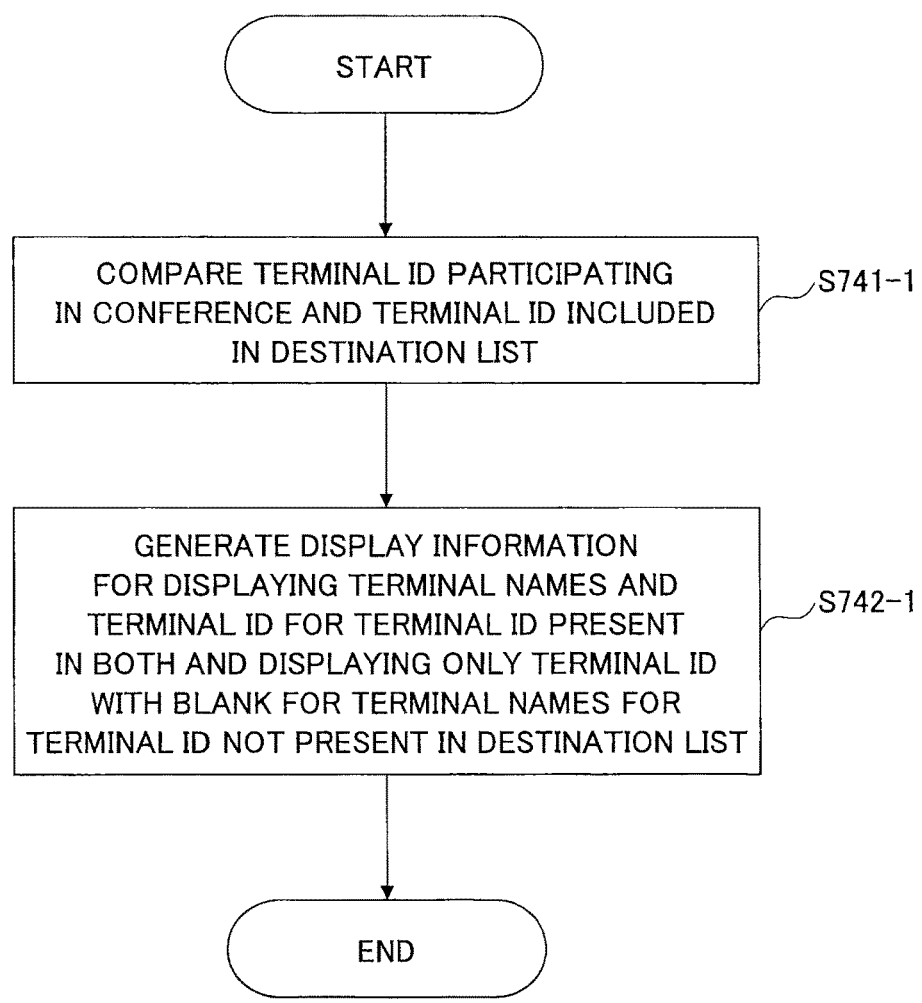
FIG. 36 illustrates one example of the process of generating display information based on the destination list according to the other embodiment.

FIG. 36 illustrates one example of the process of generating the display information based on the destination list (see Step S74-1 in FIG. 35).

In FIG. 36, the transmission management system 50 compares the terminal IDs participating in the video conference included in the terminal information (i.e., the terminal IDs of the transmission terminals that are currently connected with the destination terminal acquired in Step S72) received from the transmission management system 50 in Step S73-1 and the terminal IDs included in the destination list created when the destination is designated (Step S741-1).

Next, the transmission terminal 10 generates the display information in such a manner as to display the terminal names and the terminal IDs for the terminal IDs included in both the terminal information and the destination list, while, for the terminal IDs not included in the destination list, the terminal names are made blank and only the terminal IDs are displayed (Step S742-1).

FIG. 29 of the above-mentioned embodiment shows one example of the conference participant prior confirmation screen page displayed based on the thus generated display information. In the example shown, as the conference participants (i.e., the conference participation terminals), three transmission terminals are displayed, where, for the first and third transmission terminals, the terminal names and the terminal IDs are displayed, while, for the second transmission terminal, the terminal ID is displayed but the terminal name is made blank, whereby it is possible to know that the video conference is the conference where the transmission terminal not registered in the destination list of the own transmission terminal participates in. After thus understanding this situation, the user presses the "OK" button for participating in the video conference (entering the room), or pressing the "CANCEL" button for canceling participating in the video conference.

Figure 37:
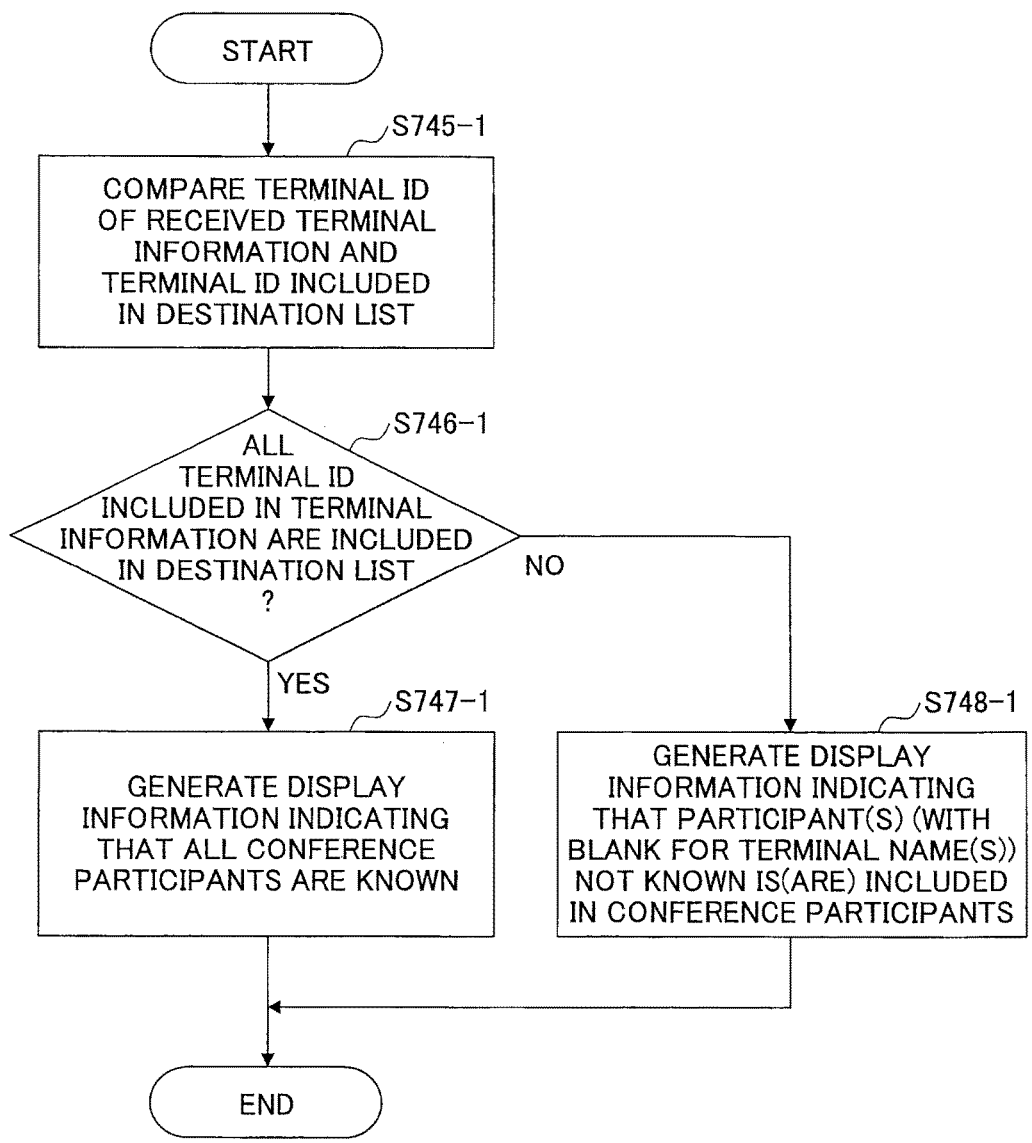
FIG. 37 illustrates another example of the process of generating display information based on the destination list according to the other embodiment.

FIG. 37 illustrates another example of the process of generating the display information based on the destination list (see Step S74-1 in FIG. 35).

In FIG. 37, the transmission terminal 10 compares the terminal IDs included in the terminal information and the terminal IDs included in the destination list created when the destination is designated (Step S745-1).

Next, the transmission terminal 10 determines all the terminal IDs included in the terminal information are included in the terminal IDs included in the destination list, by a process of searching using the terminal IDs as search keys or so (Step S746-1).

Then, when all the terminal IDs in the terminal information are included in the destination list (YES in Step S746-1), the terminal 10 generates the display information in such a manner as to display that all the conference participants are known (Step S747-1). FIG. 31 of the above-mentioned embodiment illustrates one example of the conference participant prior confirmation screen page displayed based on the thus generated display information. As shown, in the conference participant prior confirmation screen page, a message "TRANSMISSION TERMINALS OF ALL CONFERENCE PARTICIPANTS ARE REGISTERED. DO YOU ENTER ROOM?" is displayed, and an "OK" button and a "CANCEL" button are displayed.

Returning to FIG. 37, when any one(s) of the terminal IDs in the terminal information is(are) not included in the destination list (NO in Step S746-1), the transmission terminal 10 generates the display information in such a manner as to display that a conference participant(s) not known is(are) included (Step S748-1). FIG. 32 of the above-mentioned embodiment illustrates one example of the conference participant prior confirmation screen page displayed based on the thus generated display information. As shown, in the conference participant prior confirmation screen page, a message "PARTICIPANT HAVING TRANSMISSION TERMINAL NOT REGISTERED IN THIS TRANSMISSION TERMINAL IS INCLUDED IN CONFERENCE PARTICIPANTS. DO YOU ENTER ROOM? (TERMINAL ID: 01cb)" is displayed, and an "OK" button and a "CANCEL" button are displayed.

Note that, in FIG. 35, the transmission management system 50 transmits only the terminal IDs of the transmission terminals participating in the conference to the transmission terminal 10 (Step S73-1), and the transmission terminal 10 processes the thus received data (Steps S74-1). However, the process of Step S74-1 can be carried out at the side of the transmission management system 50. In this case, instead of the destination list, it is possible to use the destination list management table (see FIG. 11 of the above-mentioned embodiment) associated with the transmission terminal 10 that has transmitted the terminal information request signal.

Summary of Embodiments

As described above, according to the embodiments described above, a user can confirm, before participating in a conference, whether the conference is one in which the user intends to participate. Thus, it is possible to avoid erroneously participating in such a conference that the user does not wish to participate.

Thus, the transmission systems, transmission management apparatuses and non-transitory computer-readable information-recording media have been described in the embodiments. However, the present invention is not limited to a specific embodiment and variations and modifications may be made without departing from the scope of the present invention. In other words, the present invention should not be interpreted to be limited to the description of the specific examples and the accompanying drawings.

The present application is based on and claims the benefit of priority of Japanese Priority Application No. 2014-025604 dated Feb. 13, 2014, Japanese Priority Application No. 2014-025605 dated Feb. 13, 2014, and Japanese Priority Application No. 2014-258924 dated Dec. 22, 2014, the entire contents of which are hereby incorporated herein by reference.

What is claimed is:

1. A transmission system that manages sessions established among a plurality of transmission terminals, the transmission system comprising:
a terminal information request transmitter that transmits, from a first transmission terminal, a terminal information request requesting information identifying which of the plurality of transmission terminals are currently in an established session with a second transmission terminal, the second transmission terminal being previously selected by a user of the first transmission terminal, from a displayed destination list of the first transmission terminal, as a destination terminal with which the user wants to establish a communication session, wherein, in the destination list of the first transmission terminal, terminal IDs of corresponding destination terminals to which the first transmission terminal is able to request a start of a video conference are registered;
a display that displays a user interface allowing the user of the first transmission terminal to indicate whether the user wants to join the established session based on displayed response information received in response to the terminal information request, the displayed response information including a display list identifying which of the plurality of transmission terminals are currently in the established session with the second transmission terminal; and
processing circuitry configured to receive an input from the user indicating whether the user wants to join the established session, in response to the displayed user interface,
wherein the processing circuitry is configured to, when a specific transmission terminal currently in the established session with the second transmission terminal is registered in the destination list of the first transmission terminal, cause the display to display a terminal name and a terminal ID of the specific transmission terminal, and, when the specific transmission terminal currently in the established session with the second transmission terminal is not registered in the destination list, cause the display to not display the terminal name of the specific transmission terminal, but display the terminal ID of the specific transmission terminal, wherein the terminal name and the terminal ID of each of the plurality of transmission terminals are stored in association with one another in a memory of the transmission system.

2. The transmission system as claimed in claim 1, further comprising:
a display information transmitter that transmits display information to the first transmission terminal in response to the terminal information request, the display information being generated based on the display list of the transmission terminals currently in the established session with the second transmission terminal, the display displaying the user interface allowing the user to indicate whether the user wants to join the established session based on the display information.

3. The transmission system as claimed in claim 1, further comprising:
an identification information transmitter that transmits the list of the transmission terminals currently in the established session with the second transmission terminal, the display displaying the user interface allowing the user to indicate whether the user wants to join the established session based on the list of the transmission terminals currently in the established session, which is transmitted by the identification information transmitter.

4. The transmission system as claimed in claim 2, wherein the display is configured to display the user interface based on the display information, to allow the user to indicate whether to connect to the session currently established by the second transmission terminal.

5. The transmission system as claimed in claim 2, wherein the display is configured to display an indication that at least one transmission terminal from among the second transmission terminal and the transmission terminals currently in the established session with the second transmission terminal is not registered in the destination list of the first transmission terminal.

6. The transmission system as claimed in claim 2, further comprising:
an initial setting receiver that receives an initial setting as to whether to transmit the terminal information request when the user selects the second transmission terminal as the destination, wherein
the terminal information request transmitter is configured to determine whether to start a process according to contents of the initial setting.

7. A transmission management apparatus that manages sessions established among a plurality of transmission terminals, the transmission management apparatus comprising:
a terminal information request receiver that receives, from a first transmission terminal, a terminal information request requesting information identifying which of the plurality of transmission terminals are currently in an established session with a second transmission terminal, the second transmission terminal being previously selected by a user of the first transmission terminal, from a displayed destination list of the first transmission terminal, as a destination terminal with which the user wants to establish a communication session, wherein, in the destination list of the first transmission terminal, terminal IDs of corresponding destination terminals to which the first transmission terminal is able to request a start of a video conference are registered; and
a transmitter configured to transmit, to the first transmission terminal, a user interface that, when displayed on a display at the first transmission terminal, allows the user of the first transmission terminal to indicate whether the user wants to join the established session based on displayed response information received from the transmission management apparatus in response to the terminal information request, the displayed response information including a display list identifying which of the plurality of transmission terminals are currently in the established session with the second transmission terminal,
wherein when a specific transmission terminal currently in the established session with the second transmission terminal is registered in the destination list of the first transmission terminal, the displayed response information includes a terminal name and a terminal ID of the specific transmission terminal, and, when the specific transmission terminal currently in the established session with the second transmission terminal is not registered in the destination list, the displayed response information does not include the terminal name of the specific transmission terminal, but includes the terminal ID of the specific transmission terminal,
wherein the terminal name and the terminal ID of each of the plurality of transmission terminals are stored in association with one another in a memory of the transmission management apparatus.

8. The transmission management apparatus as claimed in claim 7, further comprising:
a display information transmitter that transmits display information to the first transmission terminal in response to the terminal information request, the display information being generated based on the list of the transmission terminals currently in the established session with the second transmission terminal, the first transmission terminal displaying the user interface allowing the user to indicate whether the user wants to join the established session based on the display information.

9. The transmission management apparatus as claimed in claim 7, further comprising:
an identification information transmitter that transmits the list of the transmission terminals currently in the established session with the second transmission terminal, the first transmission terminal displaying the user interface allowing the user to indicate whether the user wants to join the established session, based on the list of the transmission terminals currently in the established session, which is transmitted by the identification information transmitter.

10. The transmission management apparatus as claimed in claim 8, wherein
the first transmission terminal displays the user interface allowing the user to indicate whether to connect to the session currently established by the second transmission terminal.

11. The transmission management apparatus as claimed in claim 8, wherein
the first transmission terminal displays an indication that at least one transmission terminal from among the second transmission terminal and the transmission terminals currently in the established session with the second transmission terminal is not registered in the destination list of the first transmission terminal.

12. A non-transitory processor-readable information-recording medium storing a program for causing a processor of a transmission management apparatus that manages sessions established among a plurality of transmission terminals, the program causing the processor to perform a method comprising:

receiving, from a first transmission terminal, a terminal information request requesting information identifying which of the plurality of transmission terminals are currently in an established session with a second transmission terminal, the second transmission terminal being previously selected by a user of the first transmission terminal, from a displayed destination list of the first transmission terminal, as a destination terminal with which the user wants to establish a communication session, wherein, in the destination list of the first transmission terminal, terminal IDs of corresponding destination terminals to which the first transmission terminal is able to request a start of a video conference are registered; and transmitting, to the first transmission terminal, a user interface that, when displayed at the first transmission terminal, allows the user of the first transmission terminal to indicate whether the user wants to join the established session with the first transmission terminal based on displayed response information received from the transmission management apparatus in response to the terminal information request, the displayed response information including a display list identifying which of the plurality of transmission terminals are currently in the established session with the second transmission terminal, wherein when a specific transmission terminal currently in the established session with the second transmission terminal is registered in the destination list of the first transmission terminal, the displayed response information includes a terminal name and a terminal ID of the specific transmission terminal, and, when the specific transmission terminal currently in the established session with the second transmission terminal is not registered in the destination list, the displayed response information does not include the terminal name of the specific transmission terminal, but includes the terminal ID of the specific transmission terminal, wherein the terminal name and the terminal ID of each of the plurality of transmission terminals are stored in association with one another in a memory of the transmission management apparatus.

13. The non-transitory processor-readable information-recording medium as claimed in claim 12, wherein the program causes the processor to further transmit display information to the first transmission terminal in response to the terminal information request, the display information being generated based on a list of the transmission terminals currently in the established session with the second transmission terminal, the first transmission terminal displaying the user interface allowing the user to indicate whether the user wants to join the established session based on the display information.

14. The non-transitory processor-readable information-recording medium as claimed in claim 12, wherein the program causes the processor to further transmit the list of the transmission terminals currently in the established session with the second transmission terminal, the first transmission terminal displaying the user interface allowing the user to indicate whether the user wants to join the established session based on the list of the transmission terminals currently in the established session.

15. The non-transitory processor-readable information-recording medium as claimed in claim 13, wherein the first transmission terminal displays the user interface allowing the user to indicate whether to connect to the session currently established by the second transmission terminal.

16. The non-transitory processor-readable information-recording medium as claimed in claim 13, wherein the first transmission terminal displays an indication that at least one transmission terminal from among the second transmission terminal and the transmission terminals currently in the established session with the second transmission terminal is not registered in the destination list of the first transmission terminal.

17. The transmission system of claim 1, wherein the display displays the display list, which includes only the transmission terminals currently in the established session with the second transmission terminal.

18. The transmission system of claim 1, further comprising a transmission management system configured to allow the first transmission terminal to enter the session established between the second transmission terminal and the specific transmission terminal when the second transmission terminal is registered in the destination list of the first transmission terminal, even when the specific transmission terminal is not registered in the destination list.

19. The transmission management apparatus of claim 7, further comprising processing circuitry configured to allow the first transmission terminal to enter the session established between the second transmission terminal and the specific transmission terminal when the second transmission terminal is registered in the destination list of the first transmission terminal, even when the specific transmission terminal is not registered in the destination list.

20. The non-transitory information-recording medium of claim 12, further comprising allowing the first transmission terminal to enter the session established between the second transmission terminal and the specific transmission terminal when the second transmission terminal is registered in the destination list of the first transmission terminal, even when the specific transmission terminal is not registered in the destination list.

* * * * *